(12) United States Patent
Skupin et al.

(10) Patent No.: US 11,917,220 B2
(45) Date of Patent: *Feb. 27, 2024

(54) SCENE SECTION AND REGION OF INTEREST HANDLING IN VIDEO STREAMING

(71) Applicant: Fraunhofer-Gesellschaft zur Förderung der angewandten Forschung e.V., Munich (DE)

(72) Inventors: Robert Skupin, Berlin (DE); Yago Sánchez, Berlin (DE); Thomas Schierl, Berlin (DE); Cornelius Hellge, Berlin (DE); Karsten Grüneberg, Berlin (DE)

(73) Assignee: Fraunhofer-Gesellschaft zur Förderung der angewandten Forschung e.V. (DE)

( * ) Notice: Subject to any disclaimer, the term of this patent is extended or adjusted under 35 U.S.C. 154(b) by 122 days.

This patent is subject to a terminal disclaimer.

(21) Appl. No.: 17/445,860

(22) Filed: Aug. 25, 2021

(65) Prior Publication Data

US 2022/0109898 A1 Apr. 7, 2022

Related U.S. Application Data

(60) Division of application No. 16/052,132, filed on Aug. 1, 2018, now Pat. No. 11,134,282, and a continuation
(Continued)

(30) Foreign Application Priority Data

Feb. 2, 2016 (EP) .................................... 16153929

(51) Int. Cl.
*H04N 7/16* (2011.01)
*H04N 21/2343* (2011.01)
(Continued)

(52) U.S. Cl.
CPC ..... *H04N 21/234327* (2013.01); *H04L 65/75* (2022.05); *H04N 19/167* (2014.11);
(Continued)

(58) Field of Classification Search
CPC ....... H04N 21/234327; H04N 21/4728; H04N 21/6547; H04N 21/8456; H04N 21/85406; H04N 19/167; H04N 19/174
See application file for complete search history.

(56) References Cited

U.S. PATENT DOCUMENTS

| | | | |
|---|---|---|---|
| 2004/0096002 A1 | 5/2004 | Zdepski et al. | |
| 2005/0123207 A1* | 6/2005 | Marpe | H04N 19/91 375/E7.138 |

(Continued)

FOREIGN PATENT DOCUMENTS

| | | |
|---|---|---|
| CN | 103491457 A | 1/2014 |
| CN | 103621092 A | 3/2014 |

(Continued)

OTHER PUBLICATIONS

Mavlankar, Aditya, David Varodayan, and Bernd Girod. "Region-of-interest prediction for interactively streaming regions of high resolution video." Packet Video 2007. IEEE, 2007.

(Continued)

*Primary Examiner* — Gigi L Dubasky
(74) *Attorney, Agent, or Firm* — Haynes and Boone, LLP

(57) ABSTRACT

A section-specific video data stream is derived by reducing a video data stream pertaining an entire scene with conservation of conformance by use of a file format and incorporating slices into which tiles of a set of tiles are encoded which forms the section, are incorporated into a set of one or more source tracks and a set of one or more gathering tracks including construction instructions is used in order to indicate a synthesis of the section-specific video data stream
(Continued)

by signaling replacements of certain portions of the slices and instructing to copy certain portions of the slices. Further, there is described a concept pertaining an indication of a position of a region of interest.

45 Claims, 19 Drawing Sheets

Related U.S. Application Data of application No. PCT/EP2017/052159, filed on Feb. 1, 2017.

(51) Int. Cl.
| | |
|---|---|
| *H04N 21/4728* | (2011.01) |
| *H04N 21/854* | (2011.01) |
| *H04N 21/845* | (2011.01) |
| *H04N 21/6547* | (2011.01) |
| *H04L 65/75* | (2022.01) |
| *H04N 19/167* | (2014.01) |
| *H04N 19/174* | (2014.01) |

(52) U.S. Cl.
CPC ....... *H04N 19/174* (2014.11); *H04N 21/4728* (2013.01); *H04N 21/6547* (2013.01); *H04N 21/8456* (2013.01); *H04N 21/85406* (2013.01)

(56) References Cited

U.S. PATENT DOCUMENTS

| | | | |
|---|---|---|---|
| 2010/0254458 A1 | 10/2010 | Amon et al. | |
| 2015/0208095 A1 | 7/2015 | Schierl et al. | |
| 2016/0014480 A1* | 1/2016 | Maze ................. | H04N 21/8456 725/116 |
| 2016/0156935 A1* | 6/2016 | Suehring ............. | H04N 19/174 375/240.27 |
| 2017/0118540 A1* | 4/2017 | Thomas ......... | H04N 21/440263 |
| 2018/0295400 A1* | 10/2018 | Thomas ......... | H04N 21/234327 |
| 2018/0352219 A1* | 12/2018 | Maze .................. | H04N 19/176 |

FOREIGN PATENT DOCUMENTS

| | | |
|---|---|---|
| CN | 104041031 A | 9/2014 |
| GB | 2 509 953 A | 7/2014 |
| JP | 2005-303769 A | 10/2005 |
| KR | 1020150067282 A | 6/2015 |
| KR | 1020150097723 A | 8/2015 |
| KR | 10-2248185 | 5/2021 |
| TW | 201233103 A | 8/2012 |
| TW | 201249210 A | 12/2012 |
| WO | WO 2014003428 A1 | 1/2014 |
| WO | WO 2014/111421 A1 | 7/2014 |
| WO | WO2015/197815 | 12/2015 |
| WO | WO 2015/197815 A1 | 12/2015 |
| WO | WO 2015/198725 A1 | 12/2015 |
| WO | WO 2015198725 A1 | 12/2015 |

OTHER PUBLICATIONS

Office Action dated Jul. 23, 2019 issued in the parallel JP patent application No. 2018-540380 (18 pages).
Office Action dated Apr. 28, 2020 issued in the parallel JP patent application No. 2018-540380 (8 pages).
Office Action dated Jun. 15, 2020 issued in the parallel Chinese patent application No. 201780022056.9 (18 pages).
Office Action dated Jul. 30, 2020 issued in the parallel Indian patent application No. 201837028704 (6 pages).
Office Action dated Jan. 28, 2021 issued in the parallel Korean patent application No. 10-2018-7025388 (6 pages).
Office Action dated Oct. 26, 2021 issued in the parallel Japanese patent application No. 2020-155204 (20 pages).
Office Action dated May 25, 2022 issued in the parallel Korean patent application No. 10-2021-7012677 (11 pages).

\* cited by examiner

```
<?xml version="1.0"?>
<xs:schema targetNamespace="urn:mpeg:DASH:schema:MPD:20XX"
    attributeFormDefault="unqualified"
    elementFormDefault="qualified"
    xmlns:xs="http://www.w3.org/2001/XMLSchema"
    xmlns:xlink="http://www.w3.org/1999/xlink"
    xmlns="urn:mpeg:DASH:schema:MPD:20XX">

<!-- MPD: GatheringRepresentation -->
    <xs:complexType name="AdaptationSetType">
    <xs:complexContent>
    <xs:extension base="RepresentationBaseType">
    <xs:sequence>
    :
        <xs:element name="GatheringRepresentation" type="GatheringRepresentationType"
    minOccurs="0" maxOccurs="unbounded"/>
    </xs:sequence>
```

| Fig. 8A |
|---------|
| Fig. 8B |
| Fig. 8C |

```
<xs:attribute ref="xlink:href"/>
<xs:attribute ref="xlink:actuate" default="onRequest"/>
<xs:attribute name="id" type="xs:unsignedInt"/>
<xs:attribute name="group" type="xs:unsignedInt"/>
<xs:attribute name="lang" type="xs:language"/>
<xs:attribute name="contentType" type="xs:string"/>
<xs:attribute name="par" type="RatioType"/>
<xs:attribute name="minBandwidth" type="xs:unsignedInt"/>
<xs:attribute name="maxBandwidth" type="xs:unsignedInt"/>
<xs:attribute name="minWidth" type="xs:unsignedInt"/>
<xs:attribute name="maxWidth" type="xs:unsignedInt"/>
<xs:attribute name="minHeight" type="xs:unsignedInt"/>
<xs:attribute name="maxHeight" type="xs:unsignedInt"/>
<xs:attribute name="minFrameRate" type="FrameRateType"/>
<xs:attribute name="maxFrameRate" type="FrameRateType"/>
<xs:attribute name="segmentAlignment" type="ConditionalUintType" default="false"/>
<xs:attribute name="subsegmentAlignment" type="ConditionalUintType" default="false"/>
<xs:attribute name="subsegmentStartsWithSAP" type="SAPType" default="0"/>
<xs:attribute name="bitstreamSwitching" type="xs:boolean"/>
```

Fig. 8B

| Fig. 8A |
| Fig. 8B |
| Fig. 8C |

Fig. 8

```
    <xs:attribute name="GatheringRepresentationsPresent" type="xs:boolean"/>
    ⋮
    <xs:attribute name="BaseAdaptationSetIds" type="xs:StringVectorType" minOccurs="0"
        maxOccurs="unbounded"/>
  </xs:extension>
 </xs:complexContent>
</xs:complexType>
<!-- Representation -->
<xs:complexType name="GatheringRepresentationType">
 <xs:complexContent>
  <xs:extension base="RepresentationBaseType">                    ⎱ 141
   <xs:sequence>
    <xs:element name="SegmentTemplate" type="SegmentTemplateType" minOccurs="1"/>
    ⋮
    <xs:element name="idDerivationMechanism" type="DescriptorType" minOccurs="0" maxOccurs="1"/>
   </xs:sequence>
   <xs:attribute name="sameQualityRanking" type="xs:boolean"/>
   ⋮
  </xs:extension>
 </xs:complexContent>
</xs:complexType>
</xs:schema>
```

Fig. 8C

| Fig. 8A |
|---------|
| Fig. 8B |
| Fig. 8C |

Fig. 8

SCENE SECTION AND REGION OF INTEREST HANDLING IN VIDEO STREAMING

CROSS-REFERENCES TO RELATED APPLICATIONS

This application is a divisional of co-pending U.S. patent application Ser. No. 16/052,132 filed Aug. 1, 2018 which is a continuation of co-pending International Application No. PCT/EP2017/052159, filed Feb. 1, 2017, which is incorporated herein by reference in its entirety, and additionally claims priority from European Application No. 16 153 929.1, filed Feb. 2, 2016, which is incorporated herein by reference in their entirety.

The present application is concerned with video streaming concepts supporting a special treatment of scene sections or region of interest.

BACKGROUND OF THE INVENTION

In video streaming using, for instance DASH (dynamic adaptive streaming over HTTP) (HTTP=hypertext transfer protocol), the number of circumstances increases in which it would be favorable to be able to restrict the video streaming to a certain scene section or to prioritize a certain region of interest. For example, there is no need to transmit the whole panoramic view video in a head-mounted display application. Rather, merely the scene's section would need to be transmitted which pertains to the section looked at by the user. Leaving off portions of a video stream seldom leads to a valid video data stream. Circumstances where the removal of certain portions of a video data stream is allowed are mostly restricted to certain situations such as the removal of enhancement layers of a layered video stream. However, such situations mostly deal with a scalability of the amount of information conveyed by the video data stream in terms of bit depth, spatial resolution, temporal resolution or the like, rather than in terms of scene section.

Moreover, it would be favorable to be able to provide a streaming target, i.e., the client, with hints on a region of interest within a certain video's pictures in order to advantageously, for example, preset such a region of interest advantageous over other portions of the video's pictures. Until now, possibilities exist to perform such region of interest signaling, but these capabilities are restricted and put strain onto the communication between server and client.

SUMMARY

According to an embodiment, a video streaming server may be configured to access slices of a video data stream into which pictures of a video are coded each of which shows a scene, wherein the pictures are spatially subdivided into tiles and each slice has encoded thereinto no more than one tile; and render available to the client a streaming of a stream concerning a section of the scene, the stream being formatted in a file format and having a set of one or more source tracks incorporating the slices into which tiles within the section, being a set of one or more tiles wide, are encoded, and a set of one or more gathering tracks having construction instructions indicating a synthesis of a section-specific video data stream into which pictures showing the scene's section are encoded, by signaling replacements for first portions of the slices incorporated into the one or more source tracks, and/or instructing to copy second portions of the slices incorporated into the one or more source tracks.

According to another embodiment, a client may be configured to retrieve from a video streaming server a video concerning a section of a scene, the client configured to retrieve from the video streaming server a stream formatted in a file format and having a set of one or more source tracks incorporating slices, the slices in the set of one or more source tracks forming a subset of slices of a video data stream into which pictures of a video are coded each which shows the scene, wherein the pictures are spatially subdivided into tiles and each slice of the video data stream has encoded thereinto no more than one tile, the subset of slices incorporating the slices into which tiles within the section being a set of one or more tiles wide are encoded; and a set of one or more gathering tracks having construction instructions indicating a synthesis of a section-position-specific video data stream into which pictures showing the scene's section are encoded; synthesize the section- -specific video data stream according to construction instructions in the set of one or more gathering tracks by replacing first portions of the slices incorporated into the one or more source tracks by replacements signaled by the construction instructions, and/ or copying second portions of the slices incorporated into the one or more source tracks, subjecting the section-position-specific video data stream to decoding by a video decoder.

Another embodiment may have video data conceptualized for streaming a spatially variable section of a scene to a client, the video data being formatted in a file format and having a set of one or more source tracks, each source track being associated with a respective one of tiles into which pictures of a video which capture the scene entirely are spatially subdivided, wherein the source tracks have distributed thereinto slices of a video data stream into which the pictures of the video are coded such that each slice has encoded thereinto no more than one tile; and a set of one or more gathering tracks, each set of which is associated with a respective one of a plurality of positions of the section formed by a corresponding subset of the tiles and having construction instructions indicating a synthesis of a section-position-specific video data stream into which pictures showing the scene's section at the respective position are coded by signaling replacements for first portions of slices having encoded thereinto any tile of the subset of tiles from the source tracks, and/or copying second portions of the slices having encoded thereinto any tile of the subset of tiles.

According to another embodiment, a video streaming server may be configured to accompany a video stream representing a scene and being streamed from the video streaming server to a client, with an information indicating a position of a region of interest within the scene in a manner so that the position temporally varies.

According to another embodiment, a client may be configured to retrieve a video stream representing a scene from a video streaming server, and use information with which the video stream is accompanied to determine a position of a region of interest within the scene in a manner so that the position temporally varies.

According to another embodiment, a method for video streaming may have the steps of: receiving slices of a video data stream into which pictures of a video are coded each of which shows a scene, wherein the pictures are spatially subdivided into tiles and each slice has encoded thereinto no more than one tile; and rendering available to the client a streaming of a stream concerning a section of the scene, the stream being formatted in a file format and having a set of one or more source tracks incorporating the slices into which tiles within the section, being a set of one or more tiles wide, are encoded, and a set of one or more gathering tracks having construction instructions indicating a synthesis of a section-specific video data stream into which pictures showing the scene's section are encoded, by signaling replacements for first portions of the slices incorporated into the one or more source tracks, and/or instructing to copy second portions of the slices incorporated into the one or more source tracks.

According to another embodiment, a method for retrieving from a video streaming server a video concerning a section of a scene may have the steps of: retrieving from the video streaming server a stream formatted in a file format and having a set of one or more source tracks incorporating slices, the slices in the set of one or more source tracks forming a subset of slices of a video data stream into which pictures of a video are coded each which shows the scene, wherein the pictures are spatially subdivided into tiles and each slice of the video data stream has encoded thereinto no more than one tile, the subset of slices incorporating the slices into which tiles within the section being a set of one or more tiles wide are encoded; and a set of one or more gathering tracks having construction instructions indicating a synthesis of a section-position-specific video data stream into which pictures showing the scene's section are encoded; synthesizing the section-specific video data stream according to construction instructions in the set of one or more gathering tracks by replacing first portions of the slices incorporated into the one or more source tracks by replacements signaled by the construction instructions, and/or copying second portions of the slices incorporated into the one or more source tracks, subjecting the section-position-specific video data stream to decoding by a video decoder.

According to another embodiment, a method for video streaming may have the steps of: accompanying a video stream representing a scene and being streamed from the video streaming server to a client, with an information indicating a position of a region of interest within the scene in a manner so that the position temporally varies.

According to another embodiment, a method for retrieving a video stream representing a scene from a video streaming server may have the steps of: using information with which the video stream is accompanied to determine a position of a region of interest within the scene in a manner so that the position temporally varies.

Another embodiment may have a non-transitory digital storage medium having a computer program stored thereon to perform the method for video streaming having the steps of: receiving slices of a video data stream into which pictures of a video are coded each of which shows a scene, wherein the pictures are spatially subdivided into tiles and each slice has encoded thereinto no more than one tile; and rendering available to the client a streaming of a stream concerning a section of the scene, the stream being formatted in a file format and having a set of one or more source tracks incorporating the slices into which tiles within the section, being a set of one or more tiles wide, are encoded, and a set of one or more gathering tracks having construction instructions indicating a synthesis of a section-specific video data stream into which pictures showing the scene's section are encoded, by signaling replacements for first portions of the slices incorporated into the one or more source tracks, and/or instructing to copy second portions of the slices incorporated into the one or more source tracks, when said computer program is run by a computer.

Another embodiment may have a non-transitory digital storage medium having a computer program stored thereon to perform the method for retrieving from a video streaming server a video concerning a section of a scene having the steps of: retrieving from the video streaming server a stream formatted in a file format and having a set of one or more source tracks incorporating slices, the slices in the set of one or more source tracks forming a subset of slices of a video data stream into which pictures of a video are coded each which shows the scene, wherein the pictures are spatially subdivided into tiles and each slice of the video data stream has encoded thereinto no more than one tile, the subset of slices incorporating the slices into which tiles within the section being a set of one or more tiles wide are encoded; and a set of one or more gathering tracks having construction instructions indicating a synthesis of a section-position-specific video data stream into which pictures showing the scene's section are encoded; synthesizing the section-specific video data stream according to construction instructions in the set of one or more gathering tracks by replacing first portions of the slices incorporated into the one or more source tracks by replacements signaled by the construction instructions, and/or copying second portions of the slices incorporated into the one or more source tracks, subjecting the section-position-specific video data stream to decoding by a video decoder, when said computer program is run by a computer.

Another embodiment may have a non-transitory digital storage medium having a computer program stored thereon to perform the method for video streaming having the steps of: accompanying a video stream representing a scene and being streamed from the video streaming server to a client, with an information indicating a position of a region of interest within the scene in a manner so that the position temporally varies, when said computer program is run by a computer.

Another embodiment may have a non-transitory digital storage medium having a computer program stored thereon to perform the method for retrieving a video stream representing a scene from a video streaming server, having the steps of using information with which the video stream is accompanied to determine a position of a region of interest within the scene in a manner so that the position temporally varies, when said computer program is run by a computer.

Another embodiment may have a digital storage medium having stored thereon inventive video data.

Another embodiment may have a stream streamed by a video streaming method for video streaming having the steps of: receiving slices of a video data stream into which pictures of a video are coded each of which shows a scene, wherein the pictures are spatially subdivided into tiles and each slice has encoded thereinto no more than one tile; and rendering available to the client a streaming of a stream concerning a section of the scene, the stream being formatted in a file format and having a set of one or more source tracks incorporating the slices into which tiles within the section, being a set of one or more tiles wide, are encoded, and a set of one or more gathering tracks having construction instructions indicating a synthesis of a section-specific video data stream into which pictures showing the scene's section are encoded, by signaling replacements for first portions of the slices incorporated into the one or more source tracks, and/or instructing to copy second portions of the slices incorporated into the one or more source tracks.

Another embodiment may have a stream streamed by a video streaming method for video streaming having the steps of: accompanying a video stream representing a scene and being streamed from the video streaming server to a client, with an information indicating a position of a region of interest within the scene in a manner so that the position temporally varies.

It is the finding of the inventors of the present application that a section-specific video data stream may be derived by reducing a video data stream pertaining an entire scene with conservation of conformance by use of a file format and incorporating slices into which tiles of a set of tiles are encoded which forms the section, are incorporated into a set of one or more source tracks and a set of one or more gathering tracks comprising construction instructions is used in order to indicate a synthesis of the section-specific video data stream by signaling replacements of certain portions of the slices and/or instructing to copy certain portions of the slices. By this measure, reducing a video data stream so as to pertain a certain scene section only is feasible with, nevertheless, providing the recipient, i.e., the client side, with the opportunity to obtain, by performing the synthesis as instructed by the construction instructions, a conforming section-specific video data stream.

Another finding underlying the present application concerns an indication of a position of a region of interest within a scene represented by a video stream from a video streaming server to a client. It has been realized that a fixed position of a region of interest is mostly not sufficient in order to advantageously steer pre-fetching or other prioritizing concepts in most applications. Accordingly, the video stream is accompanied with an information indicating the position of the region of interest in a manner so that the position temporally varies. To keep restrain put on the server/client communication low, the information may be conveyed within file format boxes of the video stream, i.e., within the video stream itself by way of SAND (server and network assisted dash) messages and/or by way of an initial conveyance of the information at a start of the streaming session in a manner so that the information schedules forthcoming changes of the position of the region of interest.

BRIEF DESCRIPTION OF THE DRAWINGS

Embodiments of the present invention will be detailed subsequently referring to the appended drawings, in which:

FIGS. 5A-B show examples for a construction instruction being composed of a constructor tag indicating the type of construction instruction, followed by a data field length indication DFL and then followed by a data field of the data field length in case of FIG. 7A, thereby representing an example for an insertion instruction inserting, for example, a replacement into the synthesized stream, while FIG. 7B shows an example for a copying instruction having another constructor tag, the data field of which has a length also indicated by a data field length indicator, but which comprises an index to the reference track TRI, an indicator of the sample or picture or access unit which the instruction refers to, namely SO, and the indication of the portion to be copied by starting point, data offset and length, data length;

FIG. 8 consists of FIGS. 8A, 8B and 8C which together shows an example for a manifest or media presentation description file which could be used to reduce the size of the manifest by signaling a common URL template;

FIG. 14 schematically shows an example for a parametrizable gathering track using an indexable construction instruction as shown in FIG. 13, wherein FIG. 14 shows the same parametrizable gathering track at different parametrization settings wherein, by encircling, the actually executed construction instruction among the indexable construction instructions is indicated;

DETAILED DESCRIPTION OF THE INVENTION

The description of embodiments of the present application brought forward below with respect to the figures firstly concentrates on embodiments relating to video streaming supporting the streaming of a section-specific video data stream at conformance conservation. Thereinafter, embodiments relating to ROI position indication are described. In applications, both types of embodiments may be used together so as to take advantage of both concepts.

In order to motivate and ease the understanding of the embodiments relating to section-specific video data streaming, an example for an application scenario is described which illustrates a source for a wish to stream merely a section of a host scene represented by a video data stream. This example is provided with respect to HEVC as an underlying video codec but the fact that the example is provided with respect to HEVC shall not be treated as a hint that the present application and the subsequently explained embodiments would be restricted to HEVC. Rather, any other video codec may be used as a basis.

HEVC bitstreams can be generated using the "tile" concept, which break in-picture prediction dependencies (including entropy decoding dependencies). Each tile can be handled separately, e.g., can be processed by one processor/core. If each tile is included into a different slice there is no information shared among different tiles and only loop filtering of reconstructed samples might be used if turned on. If tiles are used, the whole video is structured in a rectangle pattern of N×M tiles. For certain use cases, like the presentation of a smaller window (aka. RoI) taken from a large panorama, only a subset of the tiles would need to be decoded. However, first the HEVC bitstream has to be encoded in such a way that inter-prediction is constrained in such a way that tiles of a picture are not predicated from different tiles of previous pictures. Even if these constraints are fulfilled, if those parts of the bitstream that correspond to a selection of the tiles are concatenated, while the unneeded parts of the bitstream are removed, the resulting bitstream may not be a conforming HEVC bitstream anymore.

Figure 16:
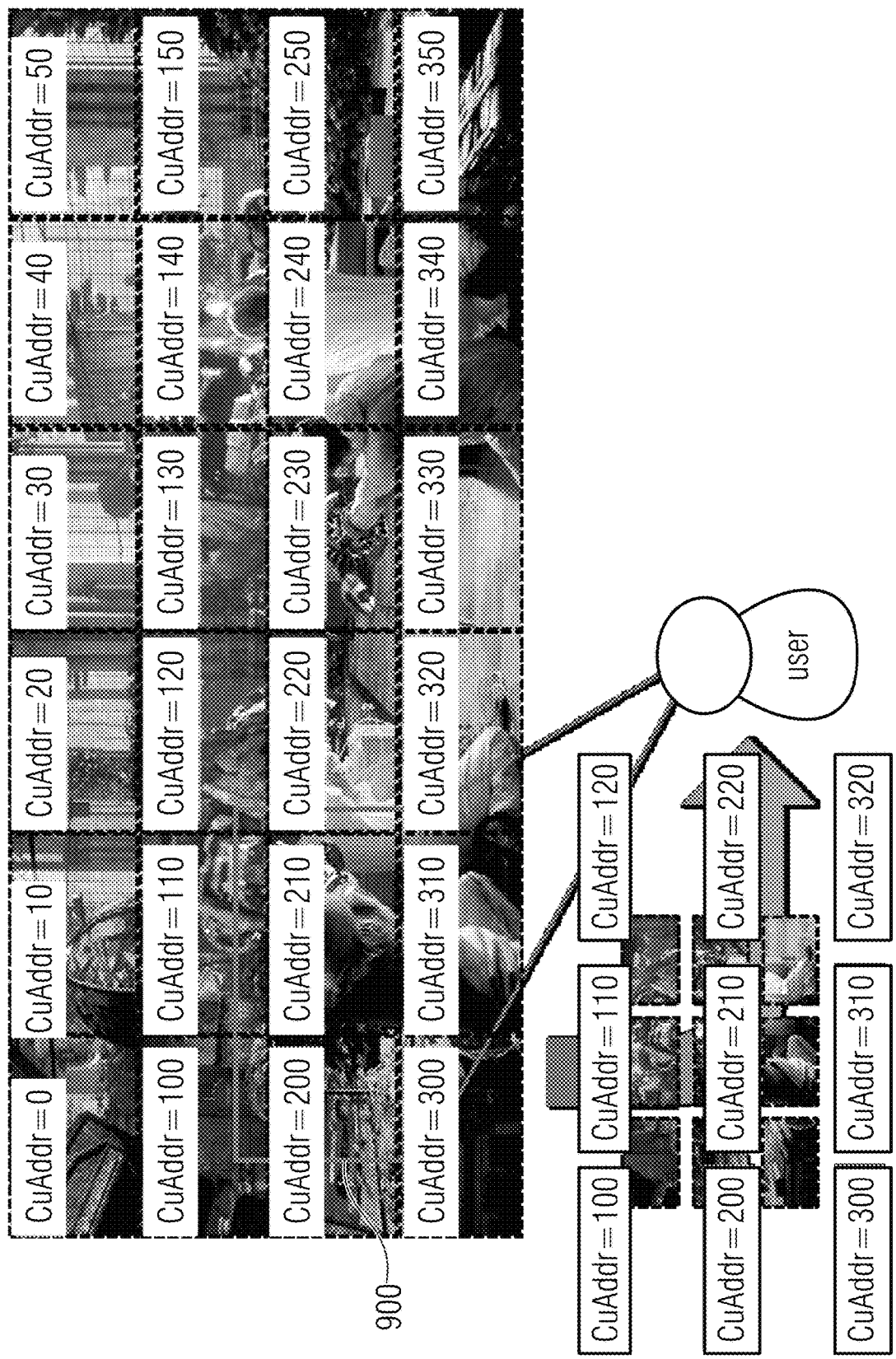
FIG. 16 shows a schematic diagram of a video subdivided into tiles so as to illustrate an exemplary use case where a section-specific video data stream transmission to a client would be favorable.

In the example shown in the FIG. 16, it is shown how for the selected RoI (depicted width the rectangle 960 in the figure), a tile subset is extracted consisting of nine tiles (Tile Sets in terms of the HEVC specification). The nine tiles are, in FIG. 16, those for which CU address 100, 110, 120, 200, 210, 220, 300, 310 and 320 are indicated. The extracted HEVC bitstream is not valid as the CuAddr of the extracted part does not start from 0 (which means it does not contain the slice with the first_slice_segment_in_pic_flag equal to 1) and some CuAddr and the corresponding data are now missing, i.e., CU addresses are not contiguous from tile to tile when passing from one Tile row to another. Obviously, this depends on which tiles are selected, e.g., if the leftmost top tile is omitted, the remaining tiles cannot form a conforming HEVC bitstream.

In addition to the described issue about the CU address space, there are additional parameters that need to be generated (such as PPS, SPS, VPS) or SEI messages to match the characteristics of the extracted bitstream (i.e., RoI which comprises a lesser amount of tiles than the whole HEVC bitstream).

That is, the above description with respect to FIG. 16 rendered clear that conformance conservation in case of removing parts of a video data stream so as to obtain a section-specific reduced video data stream is not a straightforward task. The embodiments described below allow for a transmission of a section-specific fraction of a video data stream with preserving conformances.

Figure 1:
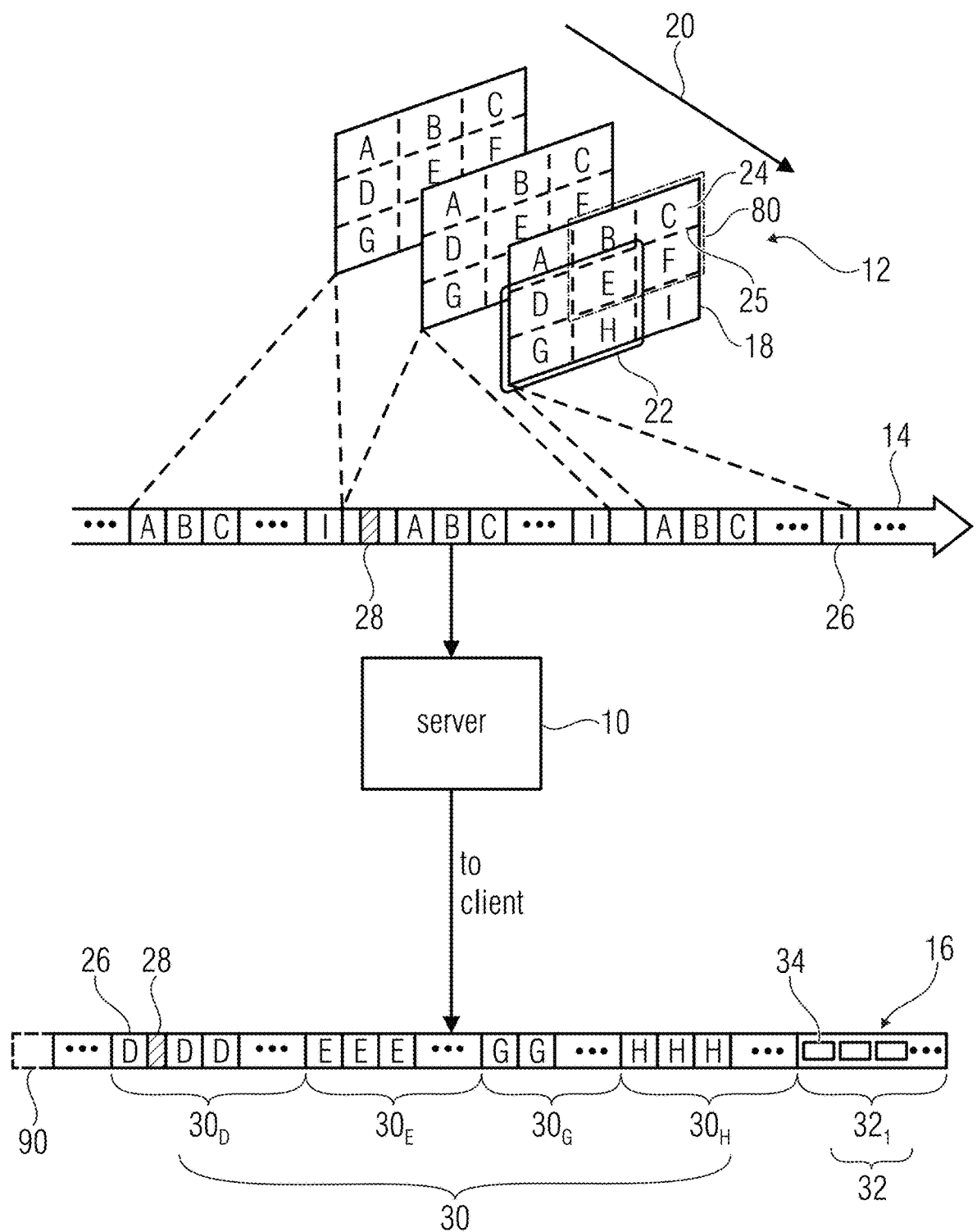
FIG. 1 schematically shows a server along with the video data stream to which server 10 has access and along with the stream which server 10 renders available to the client in accordance with an embodiment.

FIG. 1 shows a video streaming server 10 according to an embodiment of the present application and schematically illustrates, for the sake of an easy understanding of the description of the mode of operation of server 10, a video 12, the video data stream 14 into which the video 12 is coded and to which the server 10 has access at least partially as well as the stream 16, the streaming of which server 10 offers to a client in order to obtain therefrom, by synthesis described in more detail below, a section-specific video data stream. It is noted that several possibilities exist to implement server 10. For example, server 10 may be implemented in hardware such as an electronic circuit, a firmware such as a field programmable array, or in software such as by use of an appropriately programmed computer.

As described in more detail below, the video streaming server 10 is configured to render available to a client the streaming of stream 16. On the basis of the latter stream, the client is, in a manner outlined in more detail below, able to synthesize a section-specific video data stream. Favorably, the amount of data in stream 16 is reduced compared to the amount of data or video data stream 14. To understand the principles, the video data stream 14 and the way the video 12 has been coded into video data stream 14 is described first. The server 10 has access to the video data stream 14 at least with respect to that part of video data stream 14 which is not removed by server 10 for constructing stream 16 based thereon.

As shown in FIG. 1, video 12 is composed of a sequence of pictures 18. The sequential order 20 at which the exemplary three consecutive pictures 18 out of video 12 are shown in FIG. 1 may correspond to the output or presentation time order. Each picture 18, thus, represents a spatial sampling of a scene, i.e., is composed of an array of samples and, accordingly, video 12 represents a spatial temporal sampling of the scene. Each of the pictures 18 shows the scene entirely. The term "entirely" shall denote the fact that each of the pictures 18 coded into data stream 14 show a scene whereas pictures coded into the section-specific video data stream synthesizable on the basis of stream 16 as described later on, merely show a section 22 of the scene.

The pictures are spatially subdivided into tiles. The subdivision of pictures 18 into tiles may be such that the tiles are regularly arranged in rows and columns. In the example of FIG. 1, for instance, the pictures 18 are shown to be sub-divided into a 3×3 array of tiles, wherein the tiles are generally indicated using reference signs 24 and distinguished from one another by labelling the tiles within one picture 18 using A to I. However, the number of tiles per picture is not restricted to this number of tiles. Rather, the pictures 18 may be cut into any array N×M tiles instead with, for instance, N×M>2. It should be noted, however, that the tiles 24 may have shapes other than rectangular shapes. Moreover, the subdivision of pictures 18 into an array of tiles 24 arranged in rows and columns should also not be treated as being restrictive. Rather, other sorts of tile partitioning may be used. It is also noted that the tiles 24 should not be restricted to the "tiles" as denoted in the HEVC standard relating to the tile concept of HEVC. The tiles 24 mentioned here in FIG. 1 shall denote any sub-area of the sub-areas into which pictures 18 are subdivided. As shown in FIG. 1, it may be favorable if the pictures' subdivisioning into tiles 24 is equal among the pictures 18 so that the tile borders between the tiles coincide when comparing the tile borders 26 of pictures 18.

Although the detailed way as to how pictures 18 are encoded into a data stream 14 are manifold, the coding shall at least be done in such a manner that the video data steam 14 is composed of a sequence of slices 26.

Slices 26 are, for instance, units at which data stream 14 may be transmitted. Slices 26 may, for instance, form units at which data stream 14 may be individually or in sets of consecutive slices, be packetized into NAL units or transform packets, respectively. As described in more detail below, each slice 26 may be composed of a slice header and a payload section. For the time being, it shall suffice to say that pictures 18 are encoded into the slicers 26 of data stream 14 such that each slice has encoded thereinto no more than one tile 24. In FIG. 1, it is, for example, illustrated that each tile 24 is encoded into exactly one slice 26, but this is merely an example and should not be treated as restricting the scope of the embodiment of FIG. 1. In FIG. 1, the capital letters A to I and dashed lines leading from pictures 18 to data stream 14 are used in order to illustrate the association between slices 26 and tiles 24, respectively. As illustrated in FIG. 1, data stream 14 may comprise slices 26 ordered in a manner so that slices 26 associated with tiles 24 of a certain picture 18 are arranged within data stream 14 in a manner so that there is no slice between them which is/has a tile of any other picture encoded thereinto. That is, slices 26 carrying tiles 24 of different pictures 18 are not interleaved. That is, however, also merely an example and should not be treated as restricting the further description. For the sake of completeness, FIG. 1 also illustrates that there might be slices 28 within data stream 14 which are not attributable to any specific tile 24 of a picture 18. Such slices 28 may, for instance, carry coding parameters the validity or scope of which pertain to more than one tile, a whole picture 18 or even a sequence of pictures 18. While the description brought forward below focuses on slices 26, it is clear that slices 28 may be treated in a similar manner as described with respect to slices 26 in order to gain advantage of the positive effects underlying the present embodiment.

As already denoted above, server 10 has access to slices 26 of video data stream 14. For instance, video data stream 14 may be stored on a digital storage medium as it is and server 10 reads the video data stream 14, or the relevant portions, therefrom in order to form stream 16. As will be explained in more detail below, however, in accordance with an alternative embodiment, server 10 has directly access to pre-conditioned video data conceptualized in a manner that server 10 may directly read stream 16 so as to be streamed to the client. The latter aspect will become clearer after having described the further details with regard to stream 16 which server 10 renders available to the client.

In particular, server 10 renders available to the client stream 16 in order to provide the client with a reduced amount of data which merely concerns section 22 of the scene. In the example of FIG. 1, for instance, section 22 is depicted as merely covering, or being formed by, a 2×2 subarray of tiles D, E, G and H. Hence, tiles A, B, C, F and I do not belong to, i.e. are external to, section 22, and accordingly, have encoded thereinto portions of pictures 18 outside section 22. Accordingly, server 10 is configured such that stream 16 has incorporated thereinto merely a fraction or subset of slices 26. In particular, server 10 is configured such that stream 16 is formatted in a file format and includes a set 30 of one or more source tracks $30_d$, $30_e$, $30_g$ and $30_H$ and a set of 32 of one or more gathering tracks. The set 30 has incorporated thereinto the slices 26 into which the tiles within section 22 are encoded, i.e. tiles D, E. G and H. In FIG. 1, an embodiment has been selected and depicted, where each source track of set 30 is associated with one of the tiles within section 22 with the association being indicated by use of the respective capital letter of a low-ranking index of reference sign 30. That is, in case of this embodiment, each source track incorporates the slices 26 into which the associated tile 24 is encoded.

If present, a predetermined rule may be used in order to distribute other slices such as slice 28 onto set 30. The way this is done is not critical here. Moreover, according to an alternative embodiment, no one-to-one association between source track and the tiles within section 22 is used. Rather, there may be merely one source track within set 30.

FIG. 1 illustrates the case that set 32 merely comprises one gathering track $32_1$. However, as explained later on, the set 32 of gathering tracks pertaining to section 22 may exceed one. For instance, the number of gathering tracks within set 32 may be equal to the number of tiles 24 within section 22.

The set 32 of one or more gathering tracks comprises construction instructions which indicate the aforementioned synthesis of a section-specific video data stream into which pictures merely showing the section of the scene 22 are encoded. The construction instructions are illustrated in FIG. 1 by way of a sequence of rectangles 34.

As will become clear from the following description of a client communicating with the video streaming server 10 of FIG. 1, the construction instructions 34 indicate or define the synthesis of a section-specific video data stream so as to be performed, for instance by the client, by signaling replacements of certain portions of the slices 26 incorporated into the source track set 30 and instructing to copy certain portions of the slices 26 within the source track set 30.

Figure 2:
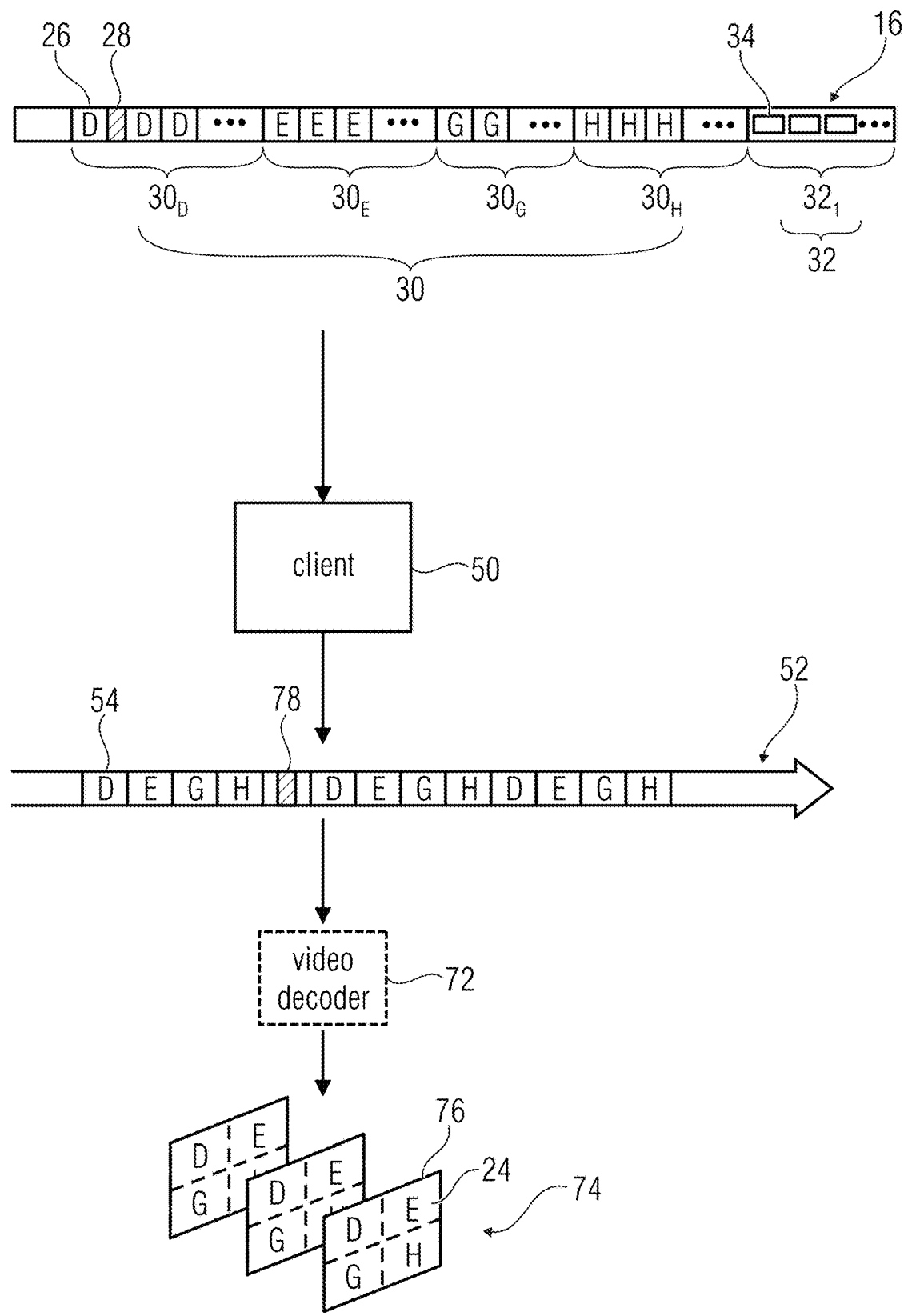
FIG. 2 schematically shows a client fitting to the server of FIG. 1 along with a schematic illustration of the inbound stream and a section-specific video data stream which the client synthesizes based thereon as well as a schematic illustration of an optionally present video decoder 72 which reconstructs a section-specific video out of the section-specific video data stream.

FIG. 2 shows a client 50 fitting to the video streaming server 10 of FIG. 1 in that the client is configured to retrieve from the video streaming server 10 a video concerning section 22 by retrieving from the video streaming server 10 the stream 16 and performing the synthesis of the section-specific video data stream as prescribed by the construction instructions 34.

In order to ease the understanding of the subsequent description of the mode of operation of client 50, FIG. 2 schematically also depicts stream 16, which client 50 retrieves from the video streaming server 10, as well the section-specific video data stream 52 which the client 50 builds by synthesis as instructed by instructions 34.

Figure 3:
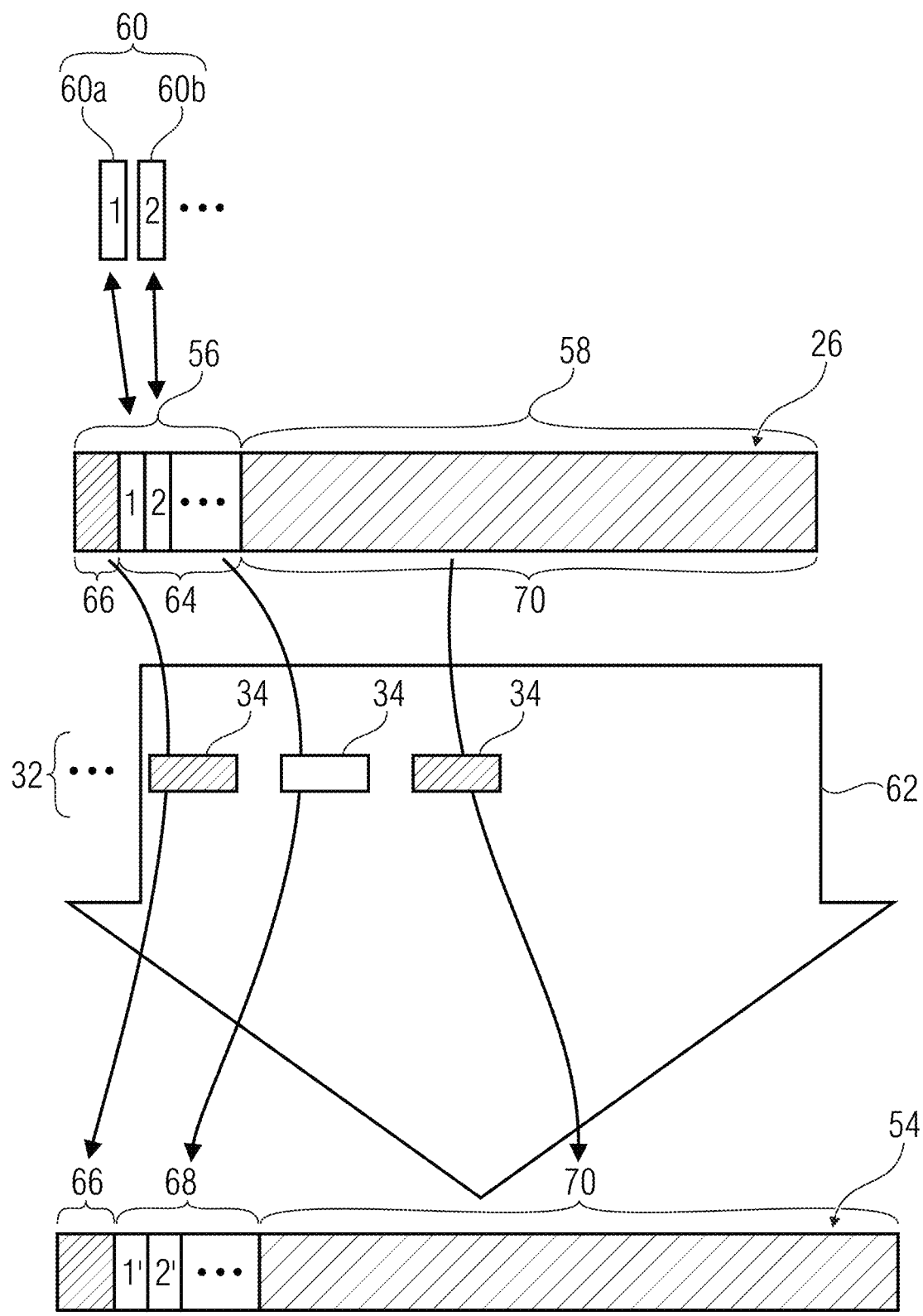
FIG. 3 shows a schematic diagram of a sub-process of the synthesis with respect to a certain slice in accordance with an embodiment.

Although the details of examples for the construction instructions 34 and the manner in which a sequence of these instructions 34 may define a suitable synthesis of the section-specific video data stream 52 are described later-on with respect to FIG. 5A-5E, a brief description is brought forward now. As was described above with respect to FIG. 1, it may be one requirement of data stream conformance that the slices 26 of different pictures are not interleaved with each other. Accordingly, the sequence of instructions 34 copies in a suitable order certain portions of the tiles belonging to one picture into data stream 52 before subsequent instructions signal a synthesis of the slices 26 concerning the tiles of a subsequent picture 18. Accordingly, in the section-specific video data stream 52 of FIG. 2, synthesized slices 54 are shown to be present in data stream 52 in an order so that, in stream order, slices pertaining to one picture are not interleaved with slices concerning another picture. The slices 54 represent modified versions of slices 26. The association between modified slices 54 and the tiles within section 22 is illustrated in FIG. 2 by way of the capital letters of the respective tiles 24. To illustrate this sort of "modification" of the slices 54 relative to slices 26, reference is made to FIG. 3 which illustrates a slice 26. In FIG. 3, slice 26 is illustrated as being composed of a syntax-element-wise coded section 56 followed by a non-syntax-element-wise coded section 58. It is to be emphasized that the order among sections 56 and 58 has been chosen merely for illustration purposes. Moreover, section 58 may even be missing while slice 26 may not be bisected into sections 56 and 58, but may have more than one of section 56 and/or 58. The term "syntax-element-wise coded" may denote the fact that the syntax elements 60 of the data stream are coded within such a section 56 into the data stream in such a manner that for each bit in the data stream within section 56 there is exactly one syntax element 60 to which the respective bit pertains and vice versa. In other words, the sequence of syntax elements 60 coded into the respective section 56 is coded in section 56 in such a manner that the junctions between consecutive syntax elements 60 are preserved in the bitstream domain so that each syntax element 60 is uniquely associable with a corresponding consecutive run of one or more bits within section 56. For example, within such section 56, a syntax element 60 may be coded without compression or by use of a variable length code. Compared thereto, "non-syntax-element-wise coded" shall denote a section 58 where the junctions between the sequence of syntax elements coded into the respective section 58 smears-out in the bitstream domain so that the bits within section 58 are no longer attributable to exactly one of the syntax elements. For example, such a section 58 may, for instance, be an arithmetically compressed portion.

For instance, it could be that section 56 is or comprises a slice header of slice 26 while section 58 is or comprises a payload section of slice 26. For example, the video codec used to code data stream 14 may, for instance, be a predictive codec. Syntax elements 60 coded into section 56 may, for instance, comprise a flag 60a indicating whether the respective slice 26 is the first slice of the respective picture coded into the respective data stream 14, and/or a syntax element 60b indicating a location or slice address of the slice portion of the picture coded into slice 26. Syntax elements 60 may, for instance, be coded into the slice header of slice 26. Syntax elements coded into the payload section and/or non-syntax-element-wise coded section 58 may be syntax elements such as coding modes, block subdivision information, prediction parameters such as motion vector components, picture reference indices and/or residual sample values and/or transform coefficient levels signaling a prediction residual.

In forming modified slice 52 out of slice 26, as part of the synthesis 62 performed by client 50, one or more of the instructions 34 within the gathering track set 32 may copy a certain portion out of data stream 26. Such instructions 34 are illustrated in FIG. 3 by using hatching. The copied portions 66 and 70 within slices 26 and 52 are also illustrated in a hatched manner. The copying is performed in the bitstream domain, i.e. no transcoding is performed. The copying is performed in the compressed or bit domain rather than in the syntax level. One or more other instructions 34 which might be interspersed or interleaved within the copy instructions shown hatched in FIG. 3, may signal a replacement to be inserted instead of a non-copied portion of slice 26 into modified slice 52. The non-copied portion(s) of slice 26 are illustrated in FIG. 3 non-hatched and the replacement is shown in a non-hatched manner within slice 52 as well. The replaced or non-copied portion 64, as shown in FIG. 3, may comprise syntax element 60 with the modified values for these syntax elements being signaled by the respective replace instruction for which one example is shown in FIG. 3 by way of a non-hatched rectangle 34. The content of replacement to be inserted within the data stream 52 within modified slice 54 instead of the respective non-copied portion 64 within the slice 26 of stream 16 may be signaled within an operator field of instruction 34 or may be signaled by the replacement operator 34 by way of some other means such as by pointing to a respective field within gathering track set 32. The sequence of instructions 34 thus results in modified slice 54: in the example of FIG. 3, a copying instruction 34 copies a copied portion 66, whereupon a replacement instruction inserts a replacement 68 into slice 54 which replaces non-copied portion 64, whereupon a copy instruction 34 copies a further copy portion 70 of slice 26 into slice 54. The modified slice 54 thus obtained pertains to the sequence of portions 66, 68 and 70 being modified compared to the original slice 26 corresponding to the sequence of portions 66, 64 and 70. It should be noted, however, that the example of FIG. 3 has been chosen for illustration purposes only, and that for instance the modification process within synthesis 62 with respect to slice 26 may start with a replacement instruction. Accordingly, the first copy instructions may, for instance not be present. Moreover, as will get clear from the following description, there may also be other construction instructions of types the execution, or participation to the synthesis, of which may, for instance, depend on a certain index filed in the instruction so that merely in case of the index in the field corresponding to a "selected" index which may serve as a kind of parameterization setting, the respective instruction is executed. The resulting gathering track, thus, varies in synthesis signaled depending on the index. Moreover, although not specifically indicated in FIG. 3, there may be portions within the synthesis reference, i.e. the slices of the source track, which are neither copied nor replaced, i.e. simply dropped/skipped, and there may be a mechanism to simply drop/skip unnecessary portions of 64.

In the manner outlined with respect to FIG. 3, the slices 54 within data stream 52 may be modified compared to the corresponding slices 26 in data streams 14 and 16 in a manner such that the syntax elements 60 are correctly registered to the circumference of section 22, i.e. refer, for example, to the upper left corner of section 22 instead of the upper left corner of pictures 18.

Thus, if this action-specific video data stream 52 is fed into a video decoder 72 as illustrated by a dashed box in FIG. 2, then the video decoder outputs a video 74, the pictures 76 of which merely show the scene's section 22 and are merely composed of, accordingly, tiles D, E, G and H.

In a manner similar to the description of FIG. 1, client 50 may be implemented in hardware, firmware of software. That is, client 50 may be an electronic circuit, field programmable array or may comprise a processor which is appropriately programmed and the same applies to video decoder 72. With respect to the video decoder 72 it may be noted that same may be included within client 50 or may be external thereto.

Figure 4:
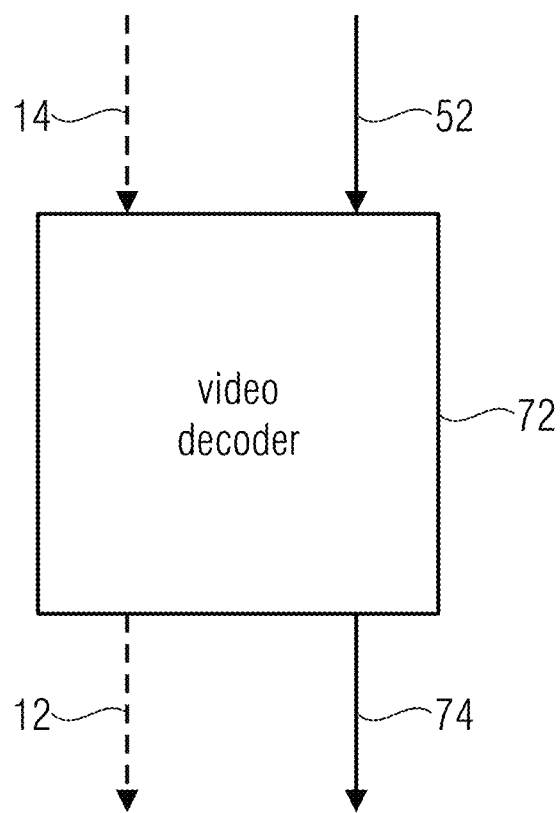
FIG. 4 shows a schematic diagram of a video decoder able to process the video data stream to which the server of FIG. 1 has access as well as the video-specific video data stream as synthesized by the client of FIG. 2 in order to illustrate the conformance maintenance.

In the manner described so far, it should have become clear that the synthesis 62 resulted in a video data stream 52 in a manner preserving conformance relative to data stream 14. For example, as described above, video conformance might have, for example, involved that the slices within a data stream which belong to one picture of the video coded into the respective video data stream are ordered along a certain tile order which traverses the tiles 24 of the pictures, for example, in a raster scan order, row-by-row, from top to bottom, for example. In video data stream 14, for instance the tiles belonging to a certain picture are traversed from A to I in the order of the ABC, and in data stream 52 the modified slices 54 are ordered in a manner so that the slices belong to the tiles of one picture 24 of video 74 in an order D, E, G, H followed by the slices concerning the tiles of a next picture and so forth. Within each modified slice 54, the syntax elements, such as syntax element 60, might have been corrected with respect to their values, while other portions of the slices may have been adopted within data stream 52 without any amendment, namely copied portions such as copy portion 70. Other slices such as slice 28 may be modified within data stream 52 as well. For example, a slice 78 is exemplarily depicted in FIG. 2 to represent a modified version of slice 28. Thus, the sequence of slices 54 within data stream 52 results from an execution of a corresponding order of instructions 34 in the set 32 of gathering tracks. The conformance preservation may be illustrated by considering the case where the video decoder capable of decoding video data stream 14 to reconstruct video 12 is alternatively fed by video data stream 52. Due to conformance preservation, the video decoder would, as a result of decoding video data stream 52, obtain video 74. It should be noted that the video decoder of FIG. 4, for instance, may be the video decoder 72 of FIG. 2 and accordingly, the same reference sign has been chosen in FIG. 4. However, it should be noted that in accordance with an alternative, video decoder 72 may not be capable of decoding the original video data stream 14 due to a reduced complexity level of video decoder 72. For instance, using the terminology of MPEG standards, the video decoder 72 may, for instance, be a video decoder according to a profile, level or tier which is not sufficient to decode the original video data stream 14, but suffices to decode the reduced video data stream 52. Nevertheless, both data streams 14 and 52 are conforming to one video codec such as, for instance, HEVC.

Before providing further details for implementing the embodiments described so far, some notes shall be submitted for the ease of understanding. For instance, the above description focused on the server's 10 capability of providing the client with a section-specific stream 16 which is specific for one certain section 22 of this scene of pictures 18. Naturally, server 10 may be capable of providing a corresponding set 30 of source tracks and set 32 of gathering tracks in the form of a corresponding output stream with respect to some other section of this scene depicted by a dash-dotted line 80 in FIG. 1 which exemplarily encompasses, or is formed by, tiles B, C, E and F. That is, both sections 22 and 80 are rectangular sections of the scene composed of a corresponding n×m subarray of tiles of pictures 18. The set 30 of source tracks would then convey the slices concerning tiles B, C, E and F and the set of one or more gathering tracks, i.e. 32, would perform a corresponding synthesis of a reduced section-specific video data stream, the decoding of which results in pictures corresponding to scene section 24. The number of "supported" sections may even be larger than two. Beyond that, any section for which partial streaming is supported, such as 22 and 80, are not restricted to cover, or be as wide as, a contiguous set of tiles. Rather, the set forming a section, may be composed of a non-contiguous set of tiles. Imagine, for example, the scene shown by pictures 18 was a 360° panorama view. In that case, a meaningful section could also be formed by sections extending from one edge of the scene to an opposite edge such as a section covering tiles C, A, F, D. In case of independently coded tiles a corresponding gathering track could nevertheless synthesize the corresponding source tracks to a conforming section-specific video data stream resulting in section specific pictures showing subsection CF stitched side by side with subsection AD. Even a rearranging of tiles in the section of the pictures 76 relative to their relative positions in pictures 18 may be feasible and meaningful depending on the application.

Moreover, the above description was rather general with respect to the manner in which the pictures are coded into data streams 14 and 52, respectively. In accordance with an example, the pictures 18 are encoded into the slices 26 of the video data stream 14 with interruption of coding interdependencies across tile boundaries of tiles 24. The pictures 18 may be encoded into the slices 26 of the video data stream 14 even such that each slice 24 has encoded thereinto the no more than one tile 24 independent from any other tile 24 covering a spatially distinct portion of the same picture, i.e. the picture including the respective tile, or any other tile covering a spatially distinct portion from any other picture. For instance, a tile E of a certain picture would be encoded into a corresponding slice 26 without any coding interdependency on any tile A, B, C, D, F, G, H, I irrespective of being within the same picture or any other picture. Such a restriction could involve that an encoder forming data stream 14 on the basis of video 12 restricts the available motion vectors near the tile boundary of a current tile so as not to point to portions of a reference picture involving samples of tiles other than tile E for forming the motion-compensated prediction. However, it should be noted that there is no obligation to use a predictive codec such as a hybrid video coding codec. For example, alternatively, the pictures 18 could be coded using wavelet coding with or without motion compensation, a lossless coding technique or the like. Moreover, since the spatial interdependencies exploited in coding pictures 18 are mostly restricted to comparatively small distances, the picture 18 could even be coded into slices 26 of the video data stream 14 without interruption of coding interdependencies across tile boundaries 25. In reconstructing the reduced video data stream 52, the loss of corresponding information by cutting out section 22 and treating the surroundings thereof as not being within the pictures 76 of video 74 would result in reconstruction distortions, but due to the limited area along the circumference of pictures 76, the resulting quality of pictures 76 might be sufficient depending on the application. With respect to the details set out below, it should also be noted that these details specifically refer to the ISO base media file format as an example for the file format for stream 52. However, stream 52 is not restricted to being formatted using this file format. Rather, any other file format may also be used. As illustrated in FIG. 1, stream 16 may, in accordance with the file format used, comprise a file header 90 defining the set 30 of source tracks and the set 32 of gathering tracks contained in the file represented by stream 16 along with, for instance, a definition of the interdependencies among the tracks 30 plus 32, such as the dependency of the set 32 of gathering tracks from the set 30 of source tracks. Moreover, depending on the file format, pointers may be contained in the file header 90 for pointing to the individual tracks within sets 30 and 32. To this end, stream 16 may be subdivided into access units or samples, each corresponding to one picture time instant of pictures 76.

Using the file format such as the ISO Base Media File Format, it is possible to store side information in the file 16 that allows reading a certain subset of the tiles 24 and produce a conforming (e.g. HEVC) bitstream 52 that can be decoded by any standard conforming decoder 72.

The output 74 of such decoder 72 may be a rectangular subset 22 of the full video format.

It should be noted that different slice headers may be used for different tile subsets 22, 80. To make sure that the slice headers have the correct CuAddr 60b for each tile subset 22, 80, multiple versions of the data could be generated. Thus, it would be possible to generate dedicated gathering tracks 32 for each tile subset 22, 80, pointing to different positions in the file 16 where the correct NAL Unit is stored with the correct CuAddr 60b.

However, this would lead to replicating all the bitstream with some tile subset specific adjustments, resulting in several drawbacks:

The file size would be increased (in many cases: multiplied)

Transmission of different tile subsets at the same time would increase (in many cases: multiply) the transport data rate Detrimental effect for caching as same tiles for different subsets would correspond to different tracks and video data.

Thus, the embodiments described so far have chosen another way:

1. The slices 26 of tiles 24 of the original bitstream are stored in separate tracks 30A-I. Each full picture 18 corresponds to the concatenation of one sample of each track 30A-I in a predefined order given by some metadata also stored in the file 16, such as in header 90.
2. For a certain tile subset 22, an additional track 32 is created, which gathers selected information from the track set 30 forming the original bitstream.
3. Multiple 'gathering' tracks can be generated, generally one such track per tile subset 22 or 80.
4. Each sample of a 'gathering' track consists of one or more constructor 34 arrays (cf. FIG. 5D).
5. The interpretation of each constructor array results in a NAL unit or a slice 54.
6. Three types of constructors might be used:
   Immediate data constructors, which hold data 100 that is specifically generated for the tile subset, cf. FIG. 5A. This can be used for instance to include the valid slice_header of each slice in the sample for the tile subset 22.
   Sample constructors, each pointing to another track, selecting information that is retrieved from a sample of that referenced track 30D . . . 30H, cf. FIG. 5B. This can be used either to point to the valid slice_header or slice payload (skipping the slice_header contiguous to the payload by using the offset). Offset 102 and length 104 of the copied portion might be operators.
   Sample entry constructors, each pointing to a sample entry of a referenced track and selecting information (such as a parameter set), cf. FIG. 5C.

Note: In contrast to structures already specified in the file format standards, the method described here can concatenate arbitrary portions of samples and concatenate these with arbitrary data given in a sample to form an output sample. Structures that have been specified earlier can refer to data in another track, but will generate some header data which is specific to the purpose for they had been designed, such as RTP hint samples, which can only generate RTP packets, though they gather data from other tracks and may include arbitrary data, or Extractor NAL Units, which can only generate one or more NAL units, though this can be truncated by indicating the length of the data block gathered from another track.

A new brand may be specified which indicates that support for new syntax elements is needed.

If the samples of a gathering track use a compatible syntax (cf. FIG. 5E), which allows parsing by legacy readers 50, ignoring the new samples, an existing code point could be used for the sample entry of such 'gathering' tracks.

The number of all possible rectangular (contiguous) tile subsets 22 (80) of a picture 18 cut into N×M tiles 24, C, is calculated using Equation 1. The resulting value of C for N≤8 and M≤8 is shown in Table 1.

$$C = \frac{N*(N+1)}{2} * \frac{M*(M+1)}{2} \quad \text{Equation 1}$$

TABLE 1

Number of possible contiguous rectangular tile subsets of an N × M arrangement

| | | Number of columns (N) | | | | | | | |
|---|---|---|---|---|---|---|---|---|---|
| | | 1 | 2 | 3 | 4 | 5 | 6 | 7 | 8 |
| Number | 1 | 1 | 3 | 6 | 10 | 15 | 21 | 28 | 36 |
| of | 2 | 3 | 9 | 18 | 30 | 45 | 63 | 84 | 108 |
| rows | 3 | 6 | 18 | 36 | 60 | 90 | 126 | 168 | 216 |
| (M) | 4 | 10 | 30 | 60 | 100 | 150 | 210 | 280 | 360 |
| | 5 | 15 | 45 | 90 | 150 | 225 | 315 | 420 | 540 |
| | 6 | 21 | 63 | 126 | 210 | 315 | 441 | 588 | 756 |
| | 7 | 28 | 84 | 168 | 280 | 420 | 588 | 784 | 1008 |
| | 8 | 36 | 108 | 216 | 360 | 540 | 756 | 1008 | 1296 |

The number of possible rectangular tile subsets 22 of a certain size n×m is calculated using Equation 2 (picture size N×M, as described above). The resulting value $C_{3,2}$ for a tile subset of 3×2 from a picture of N×M is shown in Table 2 for 3≤N≤8 and 2≤M≤8.

$$C_{n,m} = (N-n+1)*(M-m+1) \quad \text{Equation 2:}$$

TABLE 2

Number of possible 3 × 2 tile subsets of an N × M arrangement

| | | Number of columns (N) | | | | | |
|---|---|---|---|---|---|---|---|
| | | 3 | 4 | 5 | 6 | 7 | 8 |
| Number | 2 | 1 | 2 | 3 | 4 | 5 | 6 |
| of | 3 | 2 | 4 | 6 | 8 | 10 | 12 |
| rows | 4 | 3 | 6 | 9 | 12 | 15 | 18 |
| (M) | 5 | 4 | 8 | 12 | 16 | 20 | 24 |
| | 6 | 5 | 10 | 15 | 20 | 25 | 30 |
| | 7 | 6 | 12 | 18 | 24 | 30 | 36 |
| | 8 | 7 | 14 | 21 | 28 | 35 | 42 |

The above description brought forward with respect to FIGS. 2 to 5 not only reveals detailed examples concerning possible construction instructions, but also revealed the possibility that section 22 may, first of all, merely be one tile wide rather than being an array of n×m tiles wide and, second, server 10 and client 50 may operate in the above-outlined manner, but with respect to the possibility of selecting one of several sections, the number not being restricted to one (22) or two (22/80). Depending on the size of the sections at which server 10 renders available a retrieval of a section-specific video data stream and the positions of these sections, it may be that not all of the tile boundaries 25 also form a circumference of any of the sections supported by server 10. This, in turn, means that in accordance with an embodiment of the present application, it may be that the pictures 18 are encoded into the slices 26 of the video data stream 14 with an interruption of coding interdependencies merely across tile boundaries 25, co-located to a circumference of any of the sections supported by server 10. In case of supporting sections 22 and 80 only, for example, merely those tile boundaries 25 would be taken into account by the encoding of the pictures 18 into the slices 26 by interrupting the coding interdependencies which are co-located to the circumferences of sections 22 and 80, i.e. merely the tile boundaries 25 between tile pairs AD, BE, EF, HI, AB, DE, EH, and FI. In case of a higher density of sections, however, all tile boundaries 25 would cause coding interdependency interruption, for example, in accordance with an embodiment. In this regard, it is again noted that the same statement as just made with respect to the coding interdependency interruption between tiles of the same pictures, could also apply to the aforementioned possibility of also restricting the dependency on previous pictures, namely in that motion prediction is restricted in a way such that there is no dependency on portions of temporal reference pictures crossing any of the section circumferences.

Figure 6:
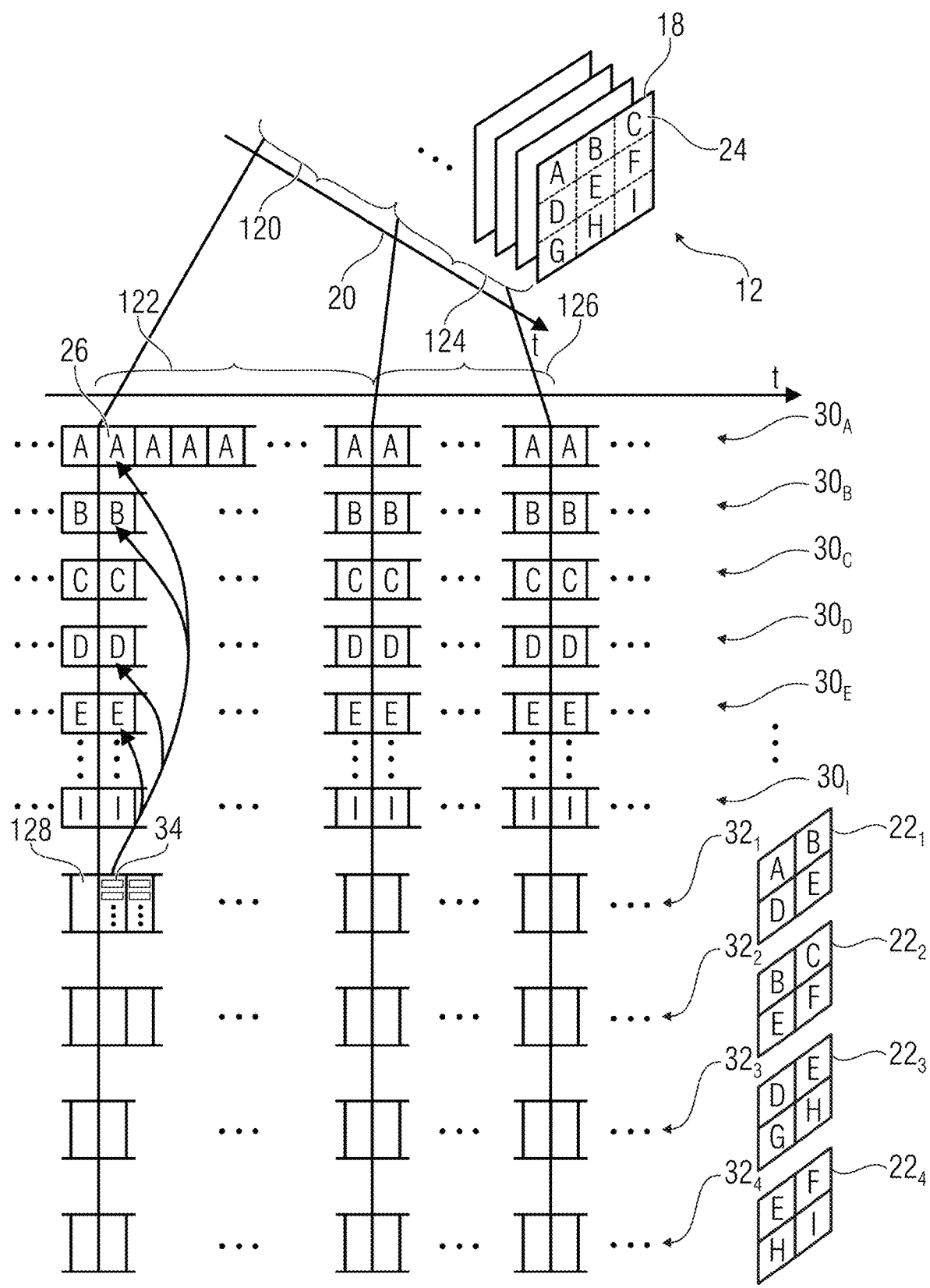
FIG. 6 shows a schematic diagram of video data conceptualized to advantageously serve as a basis for the streaming concept outlined with respect to FIGS. 1 to 4.

The following embodiments provide possible details concerning how server 10 renders available a certain stream concerning a certain section such as a stream 16 concerning section 22. In order to ease the understanding of the subsequent details, reference is made to FIG. 6 which again shows video 12 and the corresponding source tracks $30_A$ to $30_I$. Here, the example of FIG. 1 has been chosen according to which each source track incorporates the slices belonging, as far as one picture is concerned, to exactly one tile of the respective picture and the slices of the co-located tiles in the other pictures. Thus, source track $30_A$ incorporates all slices 26 concerning tile A of pictures 18. Likewise, source track $30_B$ carries all slices 26 concerning tile B of all pictures 18 in so forth. In each source track $30_A$ to $30_I$, the slices 26 belonging to one time instant or picture 18 form one "sample" in the file format stream streamed later on to the client. The sequence of samples (pictures), i.e. consecutive runs of slices concerning a certain sequence 120 of pictures form a segment 122 which is individually retrievable by the client via a corresponding URL. In FIG. 6, for example, the sequence of slices 26 having encoded therein tile A of the sequence 120 of pictures 18 form a segment 122 which is followed by slices 26 having encoded thereinto tile A of a subsequent sequence 124 of pictures 18 which form a subsequent segment 126 of source track $30_A$ and so forth. In the same manner, the other source tracks $30_B$ to $30_I$ are also subdivided temporally into samples (pictures) 120 and 124 and segments 122 and 126.

In the embodiments described next, the set 32 of gathering tracks for each section is made available in a similar manner. In FIG. 6, for example, it is illustrated that the server renders available the retrieval of four different sections $22_1$ to $22_4$ of the scene, namely sections each of which is 2×2 wide with merely the section(s) position being different thereamong. For each of these sections $22_1$ to $22_4$, one gathering track $32_1$ to $32_4$ is rendered available at the server. Each gathering track $32_1$ to $32_4$ is also temporally structured into samples and segments. For each sample 128, a gathering track, such as gathering track $32_1$, comprises construction instructions 34, the sequential execution of which results in a synthesis of a corresponding access unit of the reduced section-specific video data stream showing the corresponding section $22_1$ only, i.e. results in a synthesis of the corresponding slices reconstructing a picture showing section $22_1$. For synthesis, gathering track $32_1$ merely involves source tracks $30_A$, $30_B$, $30_D$ and $30_E$. In a similar manner, gathering tracks $32_2$ to $32_4$ contain construction instructions 34 for each sample/picture 128 with respect to the corresponding section $22_2$ to $22_4$. Just as the source tracks $30_A$ to $30_I$, the gathering tracks $32_1$ to $32_4$ are individually retrievable by the client in units of segments 122 and 126, each carrying the corresponding sequence of samples 128 of the corresponding gathering track $32_1$ to $32_4$. Thus, in the example of FIG. 6, a client needs to retrieve gathering track $32_1$ along with the referenced source tracks $30_A$, $30_B$, $30_D$ and $30_E$ in order to gain the section-specific video data stream concerning section $22_1$.

Thus, in accordance with the embodiment of FIG. 6, client 10 treats each of the source tracks $30_A$ to $30_I$ and the gathering tracks $32_1$ to $32_4$ as separate representations and would signal the circumstance to the client upon, for example, a corresponding request from the client 52 to server 10, in a manifest such as a media presentation description, which is a file describing the available media data on the server 10. However, this means that the media presentation description provided by server 10 to client 50 needs to comprise a considerable amount of information. For example, for each representation, i.e. for each of $30_A$ to $30_I$ and $32_1$ to $32_4$ (all together 13 representations), the media presentation description might comprise the indication of a base URL or URL basis, an indication of picture size, i.e. an indication of the tile size in case of the source tracks $30_A$ to $30_I$ and the indication of the section size in case of gathering tracks $32_1$ to $32_4$, a segment or URL template defining a calculation regulation for determining the URLs of the segments of the corresponding representation relative to, or in combination with, the base URL and/or the indication of representations from which the corresponding representation is dependent, such as the indication of representations $30_A$, $30_B$, $30_D$ and $30_E$ as reference representations on which representation $32_1$ is dependent. This is a considerable amount of data.

Figure 7:
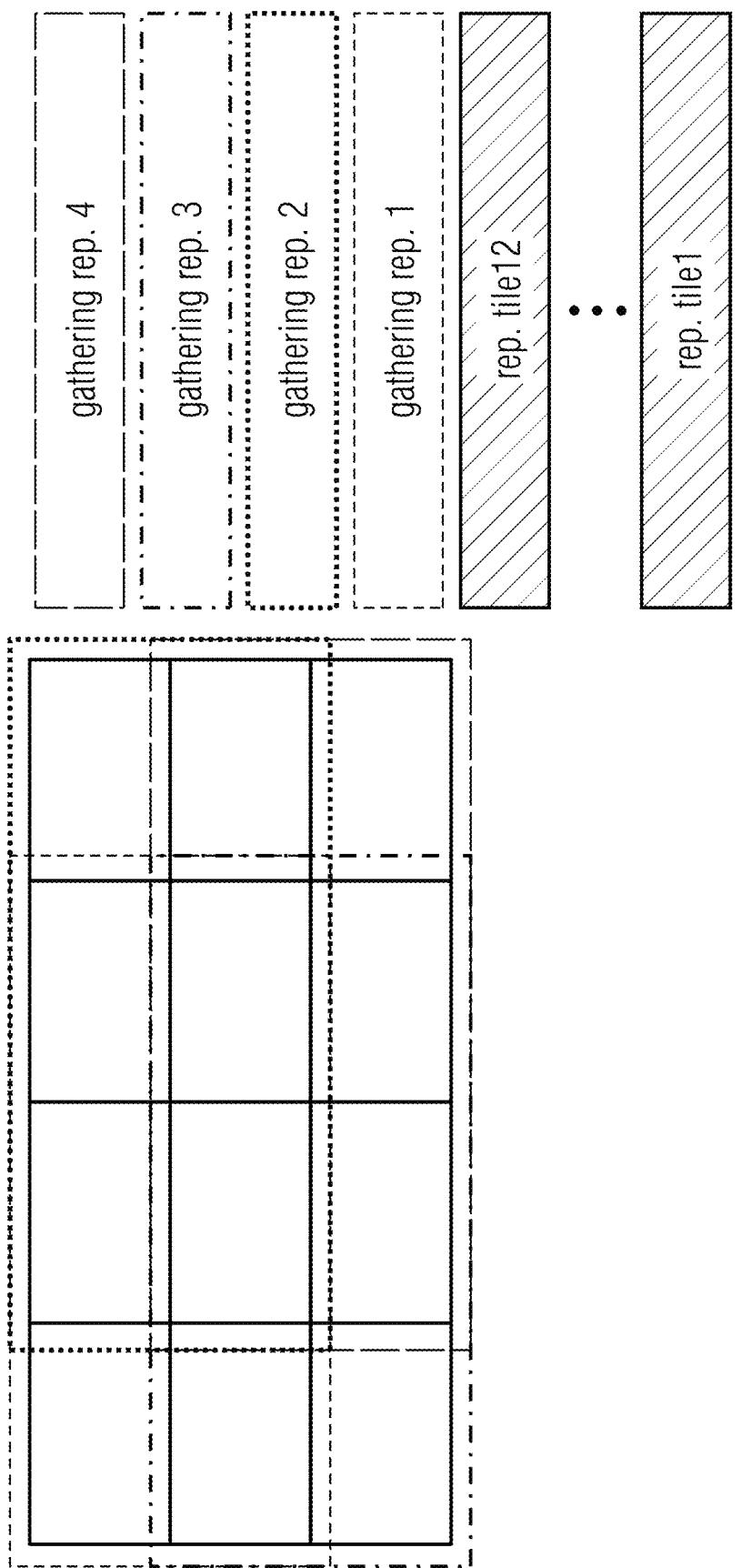
FIG. 7 schematically shows an example where the scene is subdivided into 4×3 tiles with the sections being offered to the client having a common size of 3×2 tiles each, along with illustrating the association of each tile source track and gathering track to a corresponding individual representation, thereby ending up in twelve tile representations and four gathering representations.

This is illustrated with respect to FIG. 7, which illustrates the illustrative case of a 4×3 tile partitioning and corresponding four sections of size 3×2. It is noted that in the subsequent description, the sections $22_1$ to $22_4$ are sometimes called the regions of interest RoI. Further, the representations concerning gathering tracks are called gathering representations while representations corresponding to source tracks are called tile representations.

Although the number of possible combinations can be reduced by selecting a reduced number of possible offered RoI dimensions, e.g. limiting only to 2×2, 3×2 or 3×3 tile RoIs, the number of additional tracks or Representations described in DASH in the Media Presentation Description (MPD) would be still very high. FIG. 7 shows conceptually how the described solution would be for a 4×3 tiled panorama video where 3×2 RoIs would be offered.

Each of the gathering Representations would use the @dependencyId to indicate which representations they depend on among the original representations Tile Representation Rep. Tile 1 to Rep. Tile 12.

The embodiment described next seeks to overcome the problem of having huge media presentation descriptions carrying a lot of redundant information with respect to the gathering tracks by extending the segment template concept towards a set of representations, namely the set of representations concerning the gathering tracks. Instead of the media presentation description describing each gathering representation separately, the media presentation description according to the next embodiment provides the media presentation description or manifest with a URL template defining a calculation regulation for determining the URLs of the segments of the gathering representations dependent on the section's spatial position. The calculation regulation would be such that the calculated URLs would be mutually distinct among the segments of all gathering tracks $32_1$ to $32_4$. This concept may be used if the size of the sections $22_1$ to $22_4$ is the same so that the manifest or media presentation description may describe the characteristics of the gathering representations, ones commonly for all gathering representations (sections $22_1$ to $22_4$). For example, the media presentation description or manifest could indicate, merely once, the picture size, coding profile and/or a base URL for all gathering representations. The URL or segment template would also be signaled within the manifest or media presentation description merely once for the gathering representations. The set of corresponding source tracks for the currently retrieved gathering representations could be determined by a client on the basis of the knowledge of the tiles covered by the respective section to which the retrieved gathering representation itself belongs.

In other words, the latter embodiment allows a retrieval of a gathering representation using Segment Templates for URLs. It consists of the concept of GatheringRepresentation using templates. Since all Gathering Representations depicted in FIG. 7 above should have same characteristics such as Picture dimensions, picture aspect ratio, profile, level, etc. but they differ on the dependencies on other representations and top-right position in the high resolutions video, a single Representation with a URL could be provided that would be based on a template and based on the top-right position in the high-resolution video the specific URL of each of the segment belonging to the desired gathering representation could be derived.

An instantiation in terms of signaling could be as shown in FIG. 8, which shows an example for a URL template for gathering representations.

The described signaling would allow for building the URLs and deriving the tiles based on the position of the RoI. More concretely, in order to use this gathering track template base solution, different elements and attributes are added to the MPD. First, the Tile Representations may be separated into different AdaptationSets and the existing Spatial Relationship Descriptor (SRD) may be used. Then a further AdaptationSet may be offered where the GatheringRepresentations are embedded. If GatheringRepresentations are contained within an AdaptationSet no other Representations ("normal Representations") can be offered at the same time. The presence of GatheringRepresentations may be indicated by a new attribute called @ GatheringRepresentationsPresent (or alternatively using a descriptor, e.g. EssentialProperty descriptor by adding an URN (uniform resource name) that allows as to indicate the presence of this special representations). The AdaptationSets that contain tile representations that can be downloaded to be used in conjunction with the GatheringRepresentations is indicated by an attributed @BaseAdaptationSetIds. The existing @width and @height attributes in the RepresenationBaseType used for the GatheringRepresentations, as well as in the normal Representations, can be used to derive the number of Tile Representations that are needed to use a given GatheringRepresentation. Additionally, an attribute @sameQualityRanking can be used to indicate that Representations of different tiles with different qualities should not be used in conjunction with GatheringRepresentations. Since a template URL is used for deriving the URLs of the segments of the GatheringRepresentations a mechanism is needed to derive the parameters that can be placed within such a URL template. In DASH 4 identifiers are used for Template URL substitution.

| Identifiers for URL templates | | |
|---|---|---|
| $<Identifier>$ | Substitution parameter | Format |
| $$ | Is an escape sequence, i.e. "$$" is replaced with a single "$" | not applicable |
| $RepresentationID$ | This identifier is substituted with the value of the attribute Representation@id of the containing Representation. | The format tag shall not be present. |
| $Number$ | This identifier is substituted with the number of the corresponding Segment. | The format tag may be present. If no format tag is present, a default format tag with width = 1 shall be used. |
| $Bandwidth$ | This identifier is substituted with the value of Representation@bandwidth attribute value. | The format tag may be present. If no format tag is present, a default format tag with width = 1 shall be used. |
| $Time$ | This identifier is substituted with the value of the SegmentTimeline@t attribute for the Segment being accessed. Either $Number$ or $Time$ may be used but not both at the same time. | The format tag may be present. If no format tag is present, a default format tag with width = 1 shall be used. |

$Number$ and $Time$ are used to identify a given segment within a representation and generate its URL. $RepresentationID$ and $Bandwidth$ can be used to identify a representation. The first corresponds to a unique identifier, while the second one can be shared among more than one representation. Therefore, a rule is used to derive the $RepresentationID$ of a GatheringRepresentation based on the normal representations that contain the actual tiles. This means that the SegmentTemplate element when used with GatheringRepresentation may contain this identifier and that a new constructor (or an extension of existing constructors, e.g. EssentialProperty descriptor) needs to be added that provides the mechanism to generate the $RepresentationID$. This is added into the XML syntax shown above by the element idDerivationMechanism. One example would be e.g. when @schemeIdURI equal to "urn:mpeg:dash:GatheringRepresentationIDderivation:2015" width @value equal to 1, meaning that the @id attributes of the Tile Representations are concatenated to generate the $RepresentationID$ of the corresponding GatheringRepresentation.

The described method would help to reduce the size of the MPD by using a template-based representation. However, such an approach would still involve from the client side to issue an additional HTTP GET for the gathering representation segment and would lead to a high number of small files that would be needed to be served from the server-side, which is know to be disadvantageous for servers and caches. However, this would keep the number of tracks in the 'moov' box low since only a Gathering Rep. is downloaded at each time and therefore all Gathering Rep. with same resolution could have the same track, which would allow keeping the 'moov' box small.

Since the track dependencies are described in the 'moov' box and more explicitly in the 'trak' box, the moov box should then contain a super set of all dependencies, @dependencyId would give the correct ones then in MPEG-DASH. This would lead to all dependent tracks signaled within the 'tref' box not to be present at each time, which would imply that AU reconstruction would only be possible using explicit reconstruction with multiple constructors referring to different tracks and implicit reconstruction gathering different constructors from different tracks (belonging to the desired RoI) would not be possible. This fact would lead to some overhead from some kind of "duplicated" signaling among the multiple gathering tracks.

Figure 9:
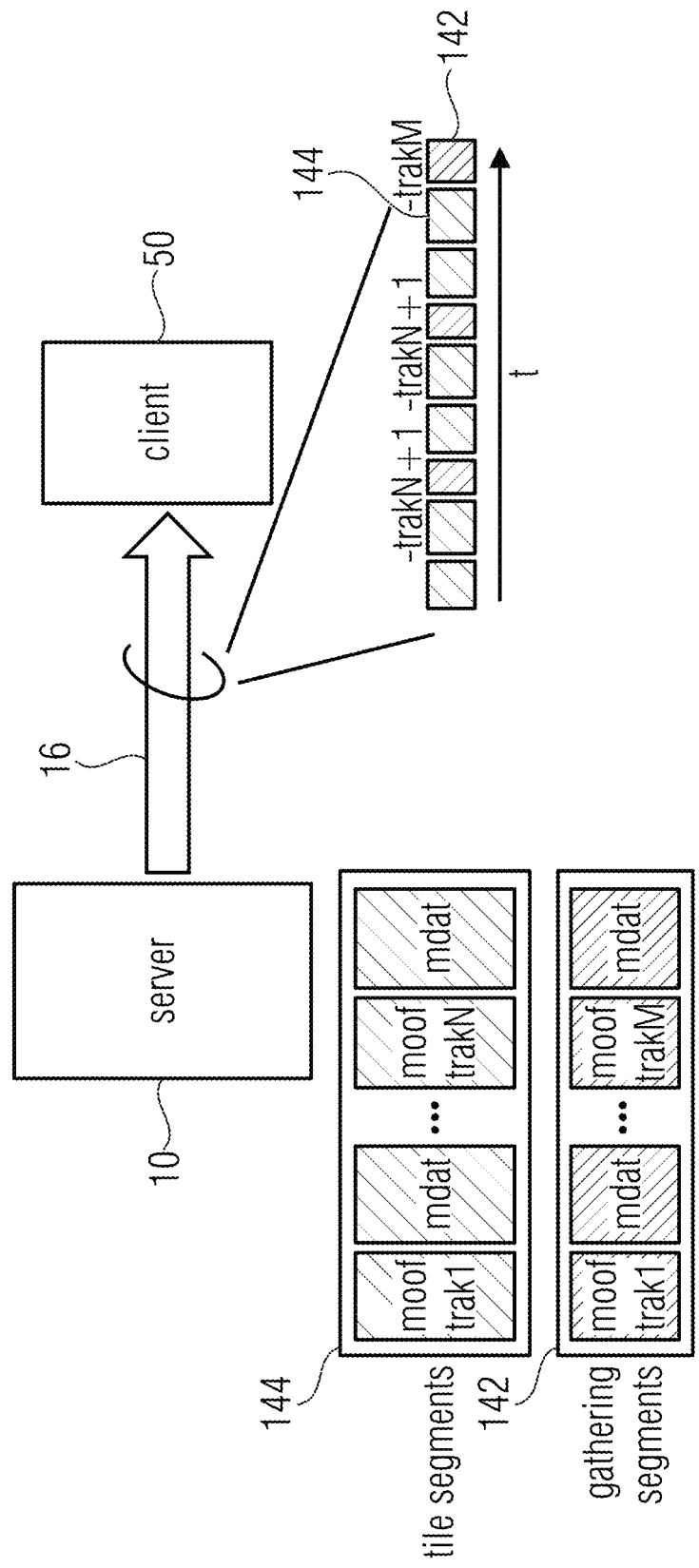
FIG. 9 shows a schematic diagram illustrating the segment traffic from server to client guided by respective segment fetches initiated by the client in accordance with the embodiment where separate representations are provided for source tracks on the one hand and gathering tracks on the other hand.

FIG. 9 shows that at the server side a lot of small files for gathering segments would be present.

Thus, although the above description provided a possibility how to reduce the size of a media presentation description 140 (FIG. 8) in order to allow for a separate treatment of the source tracks and gathering tracks as separate representations, namely tile representations and gathering representations, FIG. 9 revealed that the number of segments to be retrieved by client 50 from server 10 for each time interval corresponding to a segment of the representations is considerable. FIG. 9 distinguishes between segments of any of the tile representations on the one hand and the segments of the gathering representations on the other hand by showing segments of the gathering representations using hatching. As shown in FIG. 9, client 50 needs to retrieve for each segment 142 of the currently downloaded gathering representation N tile segments 144, wherein N is the number of tiles which the section the currently downloaded gathering representation is associated with spatially covers. In the example of FIG. 6, for instance, four segments would have to be retrieved by client 50 for a currently downloaded video section $22_1$ to $22_4$. As each segment retrieval, however, needs a corresponding request to be sent from client 50 to server 10, it could be favorable to avoid the additional sending of gathering segments 152, especially when considering the fact that these segments are rather small compared to the tile segments 144.

Figure 10:
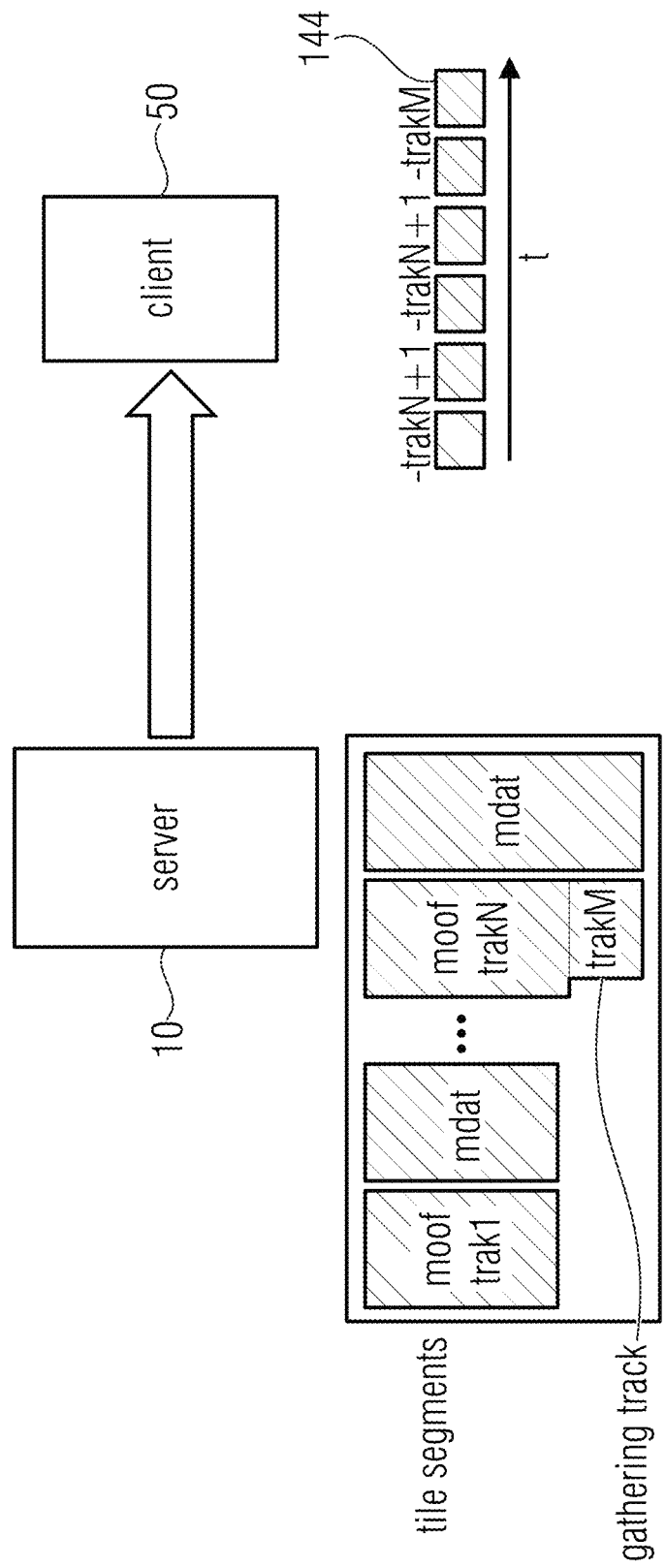
FIG. 10 shows a schematic diagram illustrating an alternative compared to FIG. 9 where the gathering track information is conveyed within the segments of the source tracks.

In order to avoid the issue of a lot of small files, which is detrimental for servers and CDNs, another embodiment consist of having at each Representation and therefore (sub)segment 2 tracks as shown in the following. The first one would correspond to a typical video track that only describes the way of recovering the samples of each tile (or group of tiles when more are encapsulated in the same track) when played independently from other tiles. See FIG. 10 and compare the situation with FIG. 9.

For the gathering track there would be several options.

Figure 11:
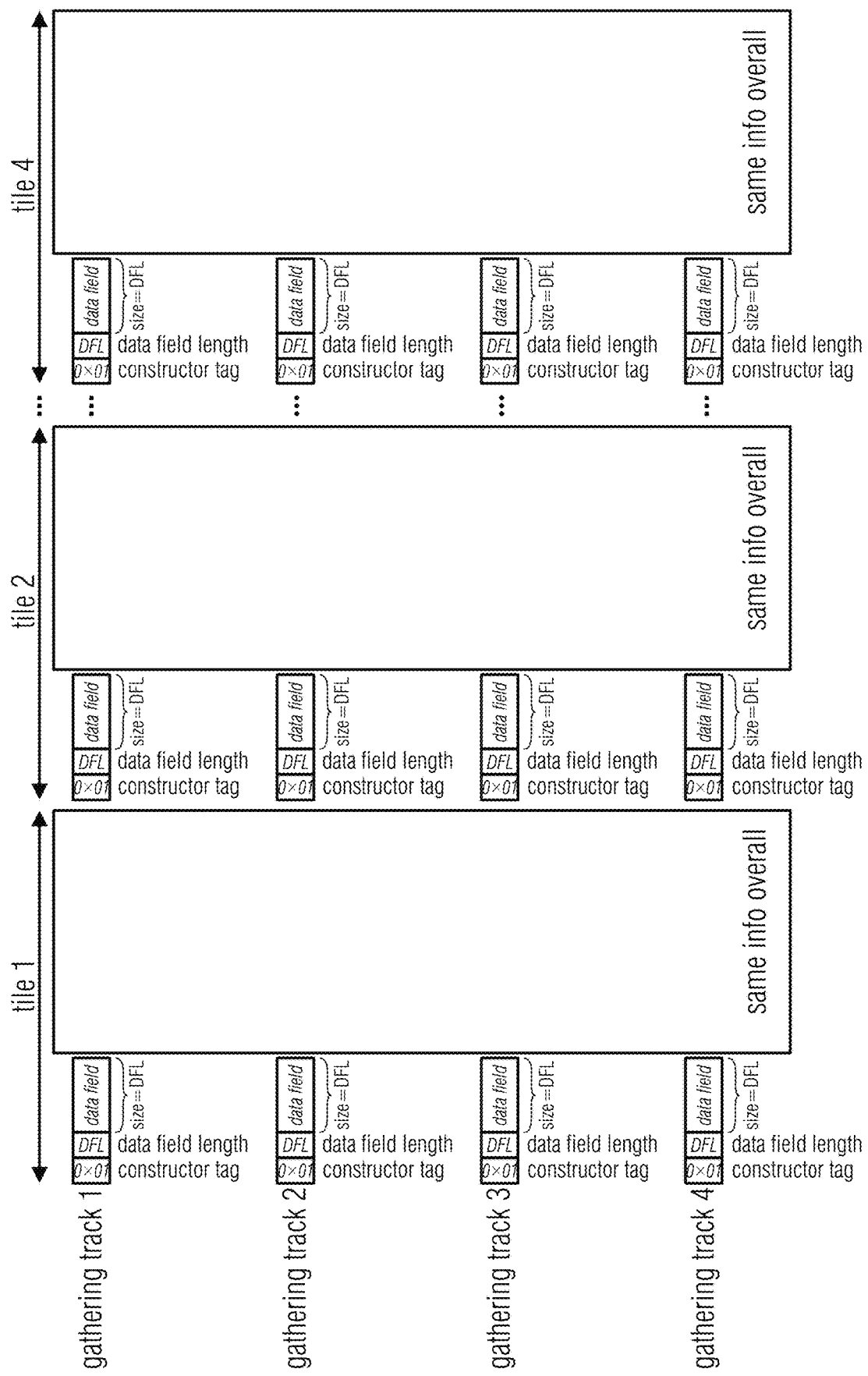
FIG. 11 illustrates the gathering tracks conveyed according to an embodiment of conveying the gathering tracks according to FIG. 10 in order to illustrate resulting redundancies.

A first one consists of using the technologies described above, which would mean that the additional track (gathering track) of the top-left tile of the desired RoI would indicate only the needed track dependencies and explicit AU reconstruction would be carried out by following the instructions of the constructors defined previously. The user would play one or another gathering track depending on which is the left-top tile (in the example in the figure it would be first trackN+1 and later trackM). When looking at the downloaded gathering tracks and assuming a single slice per sample the constructors present would be depicted in FIG. 11.

Figure 12:
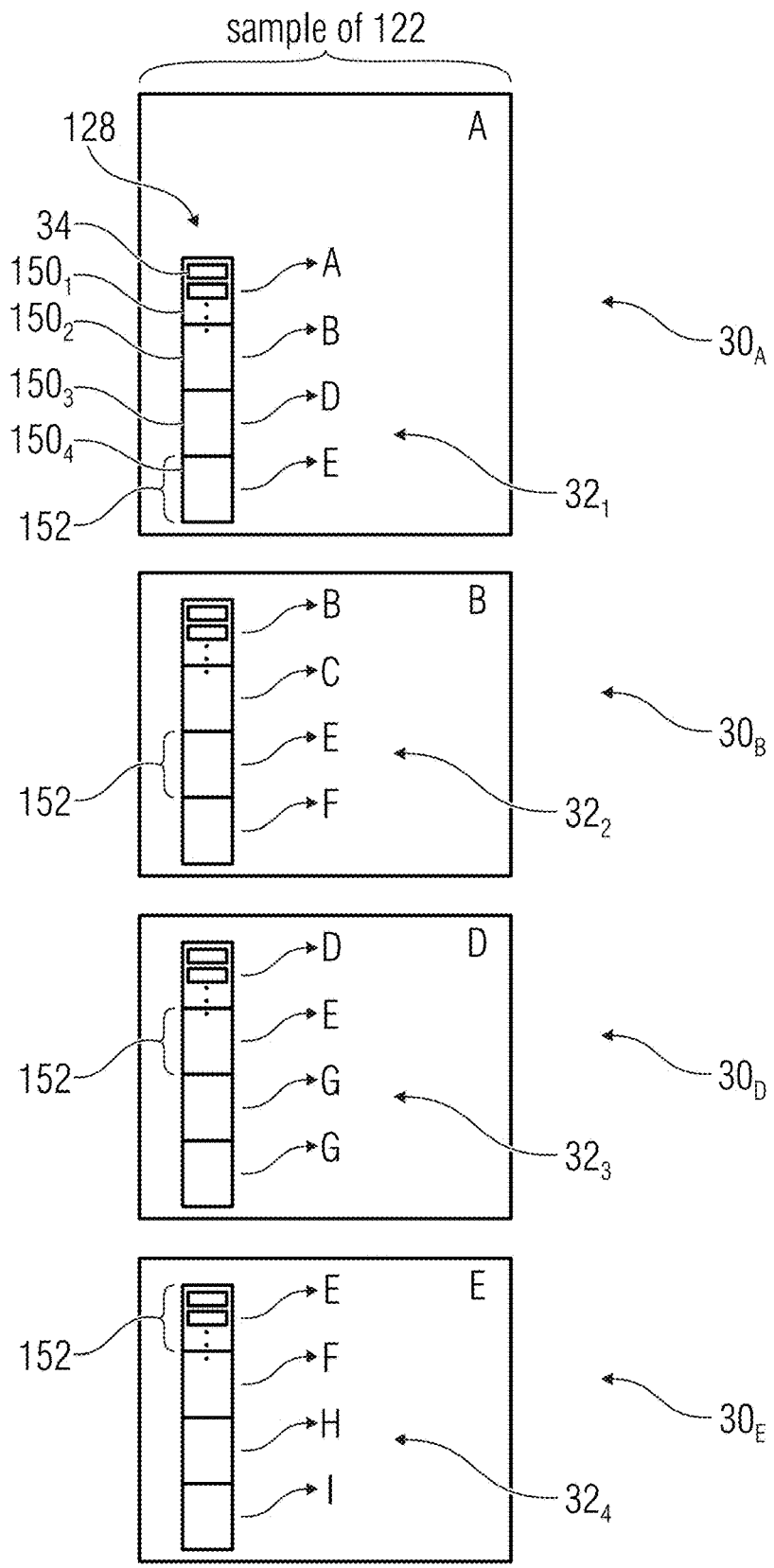
FIG. 12 shows a schematic diagram illustrating the conveyance of gathering tracks within the segments of source track representations concerning the upper left tile of the corresponding section in order to illustrate the resulting redundancies when considering the example of FIG. 6 as a basis.

In order to illustrate the situation again with reference to FIG. 6, reference is made to FIG. 12 which shows with respect to the example of FIG. 6 the four segments which client 50 would retrieve with respect to a time instant/picture/sample when being interested in section $22_1$, but here using the concept of not spending extra representations for gathering tracks. Rather, gathering tracks $32_1$ to $32_4$ are "hidden" or "included" within the segments of the source track itself. FIG. 12 shows the four segments retrieved by client 50 for a certain time instant, one for each source track $30_A$, $30_B$, $30_D$ and $30_E$. As described above, the gathering tracks $32_1$ to $32_4$ would be included within the segments of those source tracks which correspond to the tile forming the upper-left tile of the section corresponding to the respective gathering track. For example, gathering track $32_1$ is conveyed within the segments of source track $30_A$, gathering track $32_2$ is conveyed within the segments of source track $30_B$, gathering track $32_3$ is conveyed within the segments of source track $30_D$ and gathering track $32_4$ is conveyed within the segments of source track $30_E$. FIG. 12 shows one sample out of source tracks $30_A$, $30_B$, $30_D$ and $30_E$ the client 50 retrieves in order to retrieve the source tracks which gathering track $32_1$ depends on, which is included in source track $30_A$. The sequence of construction operations 34 of the sample 128 of the gathering track $32_1$ sequentially performs the synthesis with respect to tiles A, B, D and E. The sequence of construction operations is thus subdivided into four portions $150_1$ to $150_4$. In the same manner, corresponding construction instructions of gathering tracks $32_2$ to $32_4$ are contained within the other source tracks $30_B$, $30_D$ and $30_E$. The client does not need the latter ones, but they are included for clients being interested in any of the other sections $22_2$ to $22_4$. As may be seen from FIG. 12, among the portions of the construction instructions, there is one portion in each gathering track $32_1$ to $32_4$ which pertains to tile E. However, these portions are quite similar and are identical, for instance, with respect to a sub-portion illustrated by use of a curly bracket 152. The remainder of the portions pertaining to tile E not covered by portion 152 may, for instance, relate to the first-slice and slice address indication discussed above with respect to FIG. 3 using reference signs 60a and 60b. In order to remove the redundancy, the subsequently explained concept may be used. Before this is described, however, it is noted that the conveyance of gathering track $32_1$ within source track $30_A$ only, the source track concerning the upper left tile of corresponding section $22_1$, may also be varied in that, for instance, portions 151 to 154 are distributed onto the tiles covered by the corresponding section $22_1$. In that case, for instance, gathering track $32_1$ would be distributed onto source tracks $30_A$, $30_B$, $30_D$ and $30_E$.

As already discussed above with respect to FIGS. 11 and 12, there would be a lot of redundant information. Additionally, if there would be more than one possible resolution for the RoI that would group a different amount of tiles more gathering tracks would be needed, one per potential resolution, where the marked data in the figure would be redundant everywhere.

Figure 13:
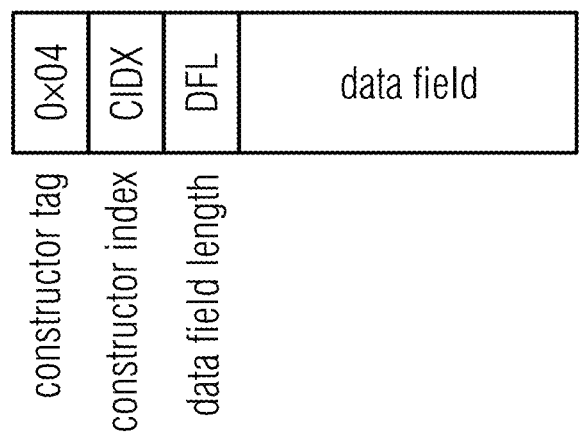
FIG. 13 shows a schematic diagram illustrating an example for a construction instruction modified so as to comprise an additional index field CIDX which allows the corresponding gathering track comprising the shown construction instruction to be parametrizable in that the construction instruction is merely executed if CIDX of the construction instruction corresponds to the index used as parametrization setting.

A further embodiment deals with the problem described before about the redundant information. For that purpose implicit reconstruction is considered, where each gathering track consists of an array of Constructors with a Constructor Index present. Depending on the position of the corresponding track within the video (or following the 'tref' dependency order) an index would be determined (i) and only the constructor with CIDX=i would be executed. Thus, it would be allowed to share common information, such as NALU Payload size and only signal the different header possibilities saving some overhead. In FIG. 13 the structure of such a constructor for the before described immediate constructor is shown (other extractors could be extended in a similar manner).

Figure 14:
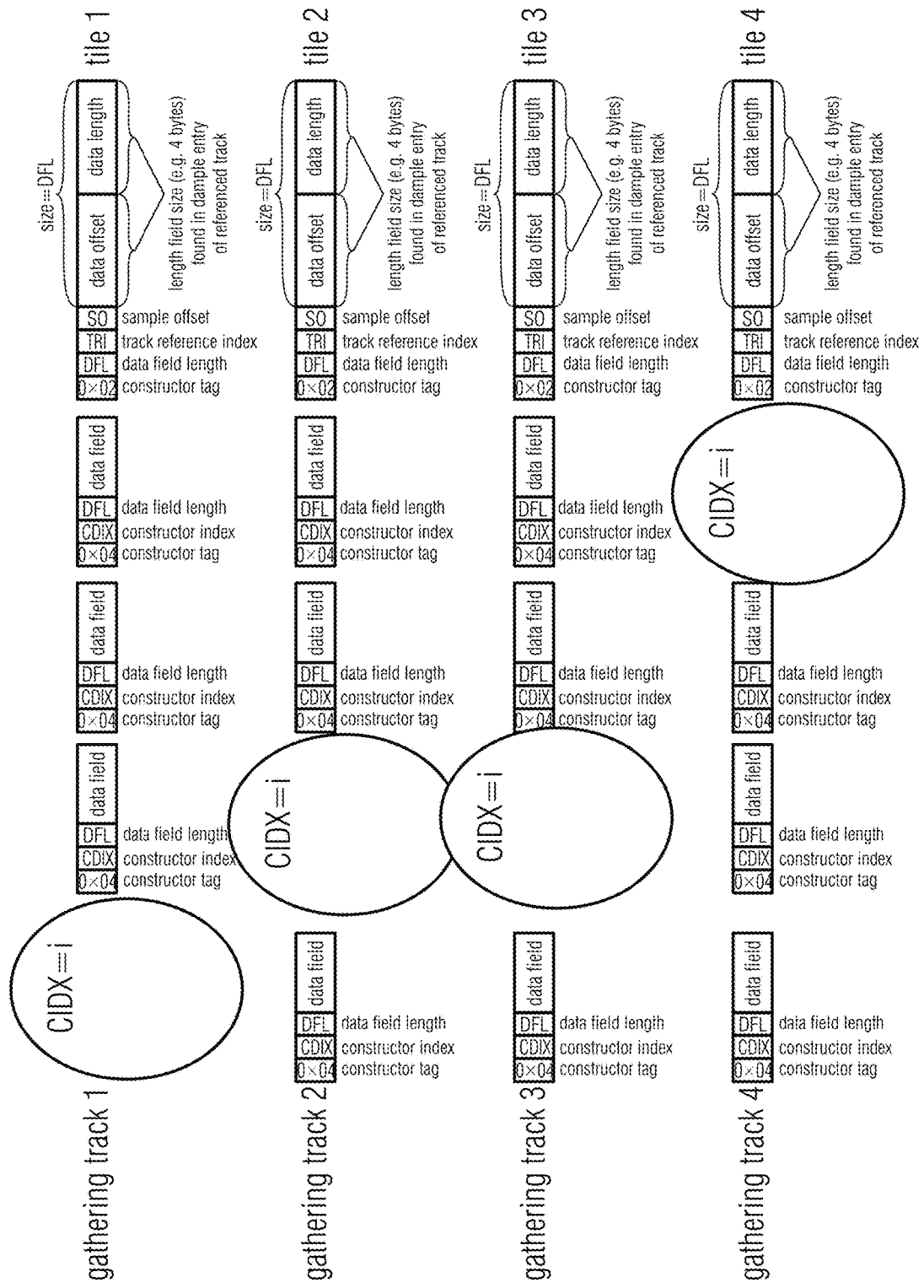

In FIG. 14 the constructors for a sample when using this technique are shown.

Thus, less redundant data would be needed, as can be seen in FIG. 14.

That is, the latter possibility of avoiding the redundancies discussed above with respect to FIG. 12 would be achieved as follows: rather than conveying a gathering track, such as gathering track $32_1$ completely within the source track concerning the upper left (or any other) tile within the corresponding section $22_1$, parametrizable gathering tracks are conveyed within each source track $30_A$ to $30_I$. The number of "parametrizations" would correspond to the number of sections overlapping with the tile to which the respective source track pertains. For example, source track $30_E$ pertains to tile E, which is a member of each section $22_1$ to $22_4$. Accordingly, the parametrizable gathering track gathering track conveyed within source track $30_E$ would have four parametrizations available. Merely two parametrizations would need to be present for the parametrizable gathering tracks conveyed within source tracks of tiles B, F, D and H and no or merely one parametrization needs to be present for source tracks for tiles A, C, G and I. The "parametrization" would turn the respective parametrizable gathering track into a respective portion of the actual gathering tracks $32_1$ to $32_4$. For instance the parametrizable gathering track conveyed within source track $30_E$ would, if parametrized using a first value, result in portion $150_4$. The client 50 would accordingly retrieve source tracks $30_A$, $30_B$, $30_D$ and $30_E$ for downloading section $22_1$ of the scene and consecutively execute for each picture or sample the (parametrized or non-parametrized) gathering track conveyed within source track $30_A$, the correspondingly parametrized gathering tracks of source tracks $30_B$ and $30_D$ and the appropriately parametrized gathering track of source track $30_E$ and so forth for the following samples or pictures. Using another parametrization, the same parametrizable gathering track of source track $30_E$ could form a portion 152 for any of the non parametrized gathering tracks $32_2$ to $32_4$. As indicated with respect to FIGS. 13 and 14, "indexable construction instructions" may be used in order to form the non-identical portion or adaptable portion of the parametrizable gathering track. Depending on the index applied, merely those indexable instructions would participate in the synthesis, the index field of which corresponds to the index applied. It is repeated, however, that the set of supported sections could be enlarged relative to the ones showing in FIG. 12 to also include ones extending from one scene edge to another as it is meaningful, for instance, if the scene is a 360° panoramic view. Additional sections with corresponding gathering tracks could be, for example, sections covering tile sets {C,A,D,F} and {D,F,G,I}. In that case, the segments of the source tracks of all tiles A to I would incorporate a parametrizable gathering track the number of parameter settings being three for segments of tracks $30_{D,E,F}$ and two for tracks $30_{A,B,C,G,H,I}$.

In order to reconstruct the access units (AU) corresponding to the selected RoI, it is obvious that several of these gathering tracks of more than one segment need to be used. In such a case, it is important to know which are the dependencies among gathering tracks that need to be followed. One option would be to follow the 'tref' dependencies of the tile at left-top position, ignoring the dependencies of other gathering tracks.

Additionally if more than one RoI dimension (N×M tiles per picture, N being number of tiles in horizontal and M in vertical) are allowed, the number of tracks would increase very quickly if this technique is not used. This would result in a lot of 'moov' boxes being needed to be downloaded or a very big 'moov' box with all tracks defined being downloaded. Implicit reconstruction with multiple tracks per Representation would allow getting rid of having to download very small segments (which are detrimental for caching and CDN performance) but would involve downloading big 'moov' boxes or a big number of them in comparison to the first approach described above, where separate representations are offered for the gathering tracks.

With implicit AU reconstruction, the technique described above could be extended so that the same tracks can be used for different RoI dimensions by adding additional CIDXs. The usage of the constructors would be the same as described above, where only those with a given index would be executed.

However, in such a case it would not be possible to derive the dependencies using the 'tref' box as it is not possible to describe different dependencies. Similarly, the sample entries describing profile, level and so forth could not be used as they are currently, since a same track would be used for different final RoI resolutions.

The 'tref' would be used by each of the Gathering tracks to indicate to which Tile Track they apply. A new box would be added to fulfil functionality of associating several gathering tracks to extract a given ROI. This track should be central and describe all possible ROIs, e.g. by some kind alternative grouping in 'moov' box. There would be multiple alternatives to play a ROI of a given dimension but each of this alternatives would correspond to a given position in the panorama video.

The current embodiment includes the definition of alternative sample groups that describe possible operation points and allow associating different tracks that need to be used simultaneously for AU reconstruction, and include the CIDX that needs to be used in the constructor array for obtaining the correct NALU.

The alternative sample groups could then describe the profile, level, i.e. they should include the same information as the sample entry.

In embodiment 2, Gathering Tracks have been considered to be offered as separate Representations. In the case non-external representations are used for the gathering tracks (i.e. they are contained in the same segments as the tiles themselves) it may signal in the MPD that different tiles can be decoded together. This can be done by adding an element or modifying the existing Subset element. The dimensions of the ROIs available using Gathering Tracks as well as mime-Type of the collectively downloaded data would be included in such an element.

Thus, briefly summarizing the most recent description concerning the conveyance of the source and gathering tracks via adaptive streaming to the client, the following should have become clear: source and gathering tracks may be conveyed within separate segments, i.e. segments of separate representations, each associated with separate URLs source track representations and gathering track representations may thus be distinguished. For a certain segment of the resulting reduced section-specific video data stream 52, the client 50 thus has to fetch the corresponding segment of each source track conveying the tiles within the wanted section plus the corresponding segment of the gathering track pertaining to the wanted section. The media presentation description or manifest may comprise an explicit signaling of the mutually distinct URL basis for the gathering representations with describing the characteristics of these gathering representations separately, such as picture size, segment template and so forth. In order to reduce the manifest file size, a URL template may be submitted within the manifest for all gathering representations commonly. The calculation regulation would define a computation of the URLs of the segments of the gathering tracks dependent on the spatial position of the section which, in accordance with this manifest reducing concept, are of the same size and differ from each other merely in scene position. The manifest may accordingly describe many or all remaining representation characteristics of the gathering representations commonly with respect to these gathering representations, such as picture size and so forth. In other embodiments, merely segments of the source tracks are associated with mutually distinct URLs and thus form segments of corresponding source track representations. In accordance with this embodiment, the client fetches for a certain wanted section the segments of those source track representations which convey slices within the wanted scene section and these segments concurrently convey or include the gathering track associated with the wanted section, which contains the construction instructions to synthesize the section-specific video data stream out of the slices conveyed within the fetched segments. The gathering track for a certain wanted section may be conveyed merely within segments of a predetermined one of the source tracks pertaining tiles within the wanted section, such as the segments conveying the slices concerning the tile within a predetermined tile position within the wanted section, such as the upper left tile of the wanted section. In another embodiment, each source track representation comprises within its segments a source track specific parametrizable gathering track. Here, the client still merely fetches those segments belonging to the source tracks pertaining to the slices of tiles being within the wanted section with appropriately parametrizing the parametrizable gathering tracks conveyed within the segments and performing the synthesis of the section-specific video data stream on the basis of the parametrized gathering tracks in a tile order defined among the tiles within the section: the samples, i.e. portions concerning a predetermined picture, of the parametrized gathering tracks are executed in tile order with then executing in tile order the following sample of the parametrized gathering tracks. The parametrization may be performed by choosing a predetermined index so that construction instructions within the parametrizable gathering track comprising another index are skipped. As described above, however, even in case of cramming gathering tracks into the segments of the source tracks, the client may be provided with information on the incorporated gathering tracks being similar to the information as conveyed within the MPD in case of treating the gathering tracks as separate representations. For example, the manifest or MPD may be provided with a promise that multiple tiles, i.e. a certain section, can be played back together, namely by indicating the presence of the corresponding gathering track, and this information may contain additionally a section related information such as an information describing profile, level and tier used to decode the section-specific video data stream resulting by synthesis using the respective gathering track. In this sense, the manifest would also indicate a restriction as to which tile sets can be played together, i.e. form one of the allowed sections, and which do not.

The above concept and embodiments could specifically embodied as follows in order to correspondingly extend the ISO base media file format. Here, optionally, independently decodable HEVC tiles might be carried in different tracks, called tile tracks. A tile track is a video track for which there is a 'tbas' reference to the HEVC track carrying the NAL units of the associated HEVC layer to which the tile(s) belong. Neither the samples in such a tile track nor the sample description box would contain VPS, SPS or PPS NAL units. Rather, these NAL units would be in the samples or in the sample description box of the track containing the associated layer, as identified by the 'tbas' track reference of the respective tile track. Both the tile track and the track containing the associated layer, as indicated by the 'tbas' track reference, may use extractors, as defined hereinafter, to indicate how the wanted bitstream is to be construed. A sample in a tile track is a complete set of slices for one or more tiles. Irrespective of using tile tracks or a track containing the whole video, same may serve as a reference or source track from which pieces are extracted as needed by use of extractors examples of which were presented above, and further examples of which are explained now. In particular, extractors for HEVC and L-HEVC tracks in ISO base media file format could enable compact formation of tracks that extract NAL unit data by reference, i.e. gathering tracks. An extractor may contains one or more constructors:

a) A sample constructor extracts, by reference, NAL unit data from a sample of another track.

b) A sample description constructor extracts, by reference, NAL unit data from a sample description.

c) An in-line constructor includes NAL unit data.

Figure 5A:
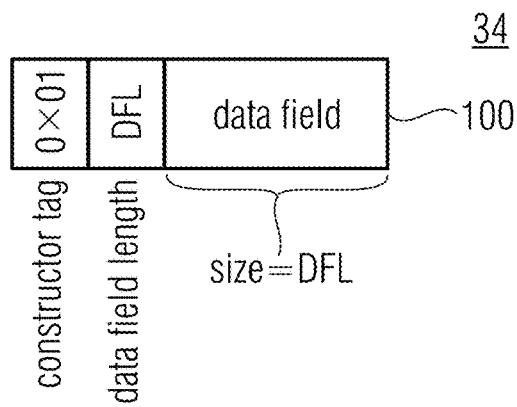
Figure 5B:
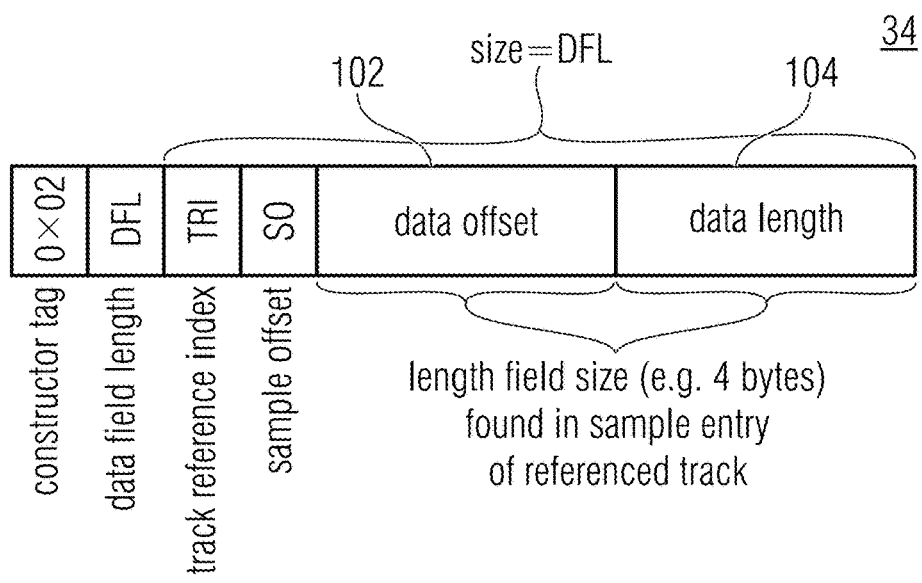
Figure 5C:
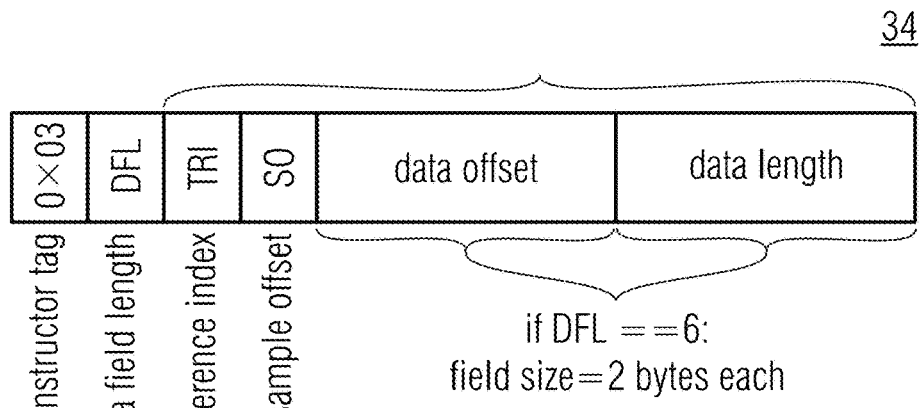
FIG. 5C schematically shows an alternative for the instruction of FIG. 7B.
Figure 5D:
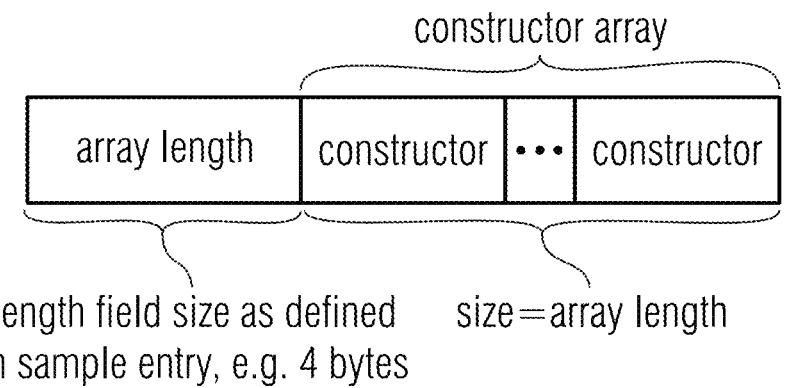
FIG. 5D schematically shows an alternative for a constructor array.
Figure 5E:
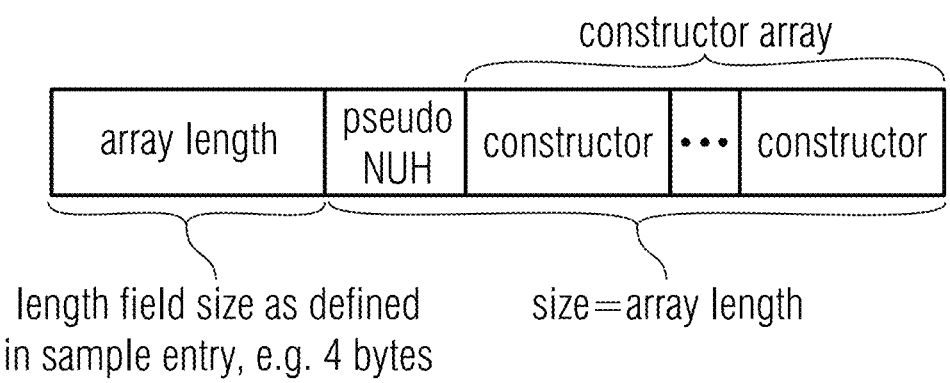
FIG. 5E shows a schematic diagram of a construction instruction array or sequence in accordance with a first embodiment.

Such an extractor may, accordingly, be composed like FIG. 5D or 5E wherein the Array length indication might be left off. Sample constructor and sample description constructor may be embodied like FIG. 5A-5C.

An aggregator may include or reference extractors. An extractor may reference aggregators. When an extractor is processed by a file reader that needs it, the extractor is logically replaced by the bytes resulting when resolving the contained constructors in their appearance order. Other than the aggregator, the bytes referred to by a sample constructor shall not contain extractors; an extractor shall not reference, directly or indirectly, another extractor. Naturally, the track that is referenced, the source track, may contain extractors even though the data that is referenced by the extractor must not.

An extractor may contain one or more constructors for extracting data from the current track or from another track that is linked to the track in which the extractor resides by means of a track reference of type 'scal'. The bytes of a resolved extractor shall be one of the following:

a) One entire NAL unit; note that when an Aggregator is referenced, both the included and referenced bytes are copied b) More than one entire NAL unit In both cases the bytes of the resolved extractor start with a valid length field and a NAL unit header.

The bytes of a sample constructor are copied only from the single identified sample in the track referenced through the indicated 'scal' track reference. The alignment is on decoding time, i.e. using the time-to-sample table only, followed by a counted offset in sample number. Extractors are a media-level concept and hence apply to the destination track before any edit list is considered. Naturally, the edit lists in the two tracks could be chosen to be identical.

A syntax example for an extractor is given below:

```
class aligned(8) Extractor ( ) {
   NALUnitHeader( );
   do {
      unsigned int(8)   constructor_type;
      if( constructor_type == 0 )
         SampleConstructor( );
      else if( constructor_type == 1 )
         SampleDescriptionConstructor( );
      else if( constructor_type == 2 )
         InlineConstructor( );
   } while( !EndOfNALUnit( ) )
}
```

As to semantics of the above syntax example, same could be:

NALUnitHeader( ) could denote the first two bytes of ISO/IEC 23008-2 NAL units. nal_unit_type might be set to 49 for ISO/IEC 23008-2 video. forbidden_zero_bit might be set as specified in ISO/IEC 23008-2. Other fields may concern nuh_layer_id and nuh_temporal_id_plus1 and might be set as specified later. constructor_type specifies the constructor that follows. SampleConstructor, SampleDescriptionConstructor, and InlineConstructor correspond to constructor_type equal to 0, 1, and 2, respectively. Other values of constructor_type might be reserved for other constructor or not. EndOfNALUnit( ) is a function that returns 0 (false) when more data follows in this extractor; otherwise it returns 1 (true).

As to sample constructor syntax, please see the following example:

```
class aligned(8) SampleConstructor ( ) {
   unsigned int(8) track_ref_index;
   signed int(8) sample_offset;
   unsigned int((lengthSizeMinusOne+1)*8)
      data_offset;
   unsigned int((lengthSizeMinusOne+1)*8)
      data_length;
}
```

The semantics for the above sample constructor syntax could be as follows:

track_ref_index: indicates the referenced track like TRI in FIGS. 5B and 5C.

sample_offset: indexes the "sample" with the referenced track, i.e. the beginning of the portion of the referenced track which corresponds to the wanted picture ID. That is, sample_offset corresponds to SO in FIG. 5B;

data_offset: The offset of the first byte within the reference sample to copy. If the extraction starts with the first byte of data in that sample, the offset takes the value 0. That is, data_offset corresponds to Data Offset in FIGS. 5B and 5C;

data_length: The number of bytes to copy. If this field takes the value 0, data_offset shall refer to the beginning of a NAL unit length field and the entire single referenced NAL unit is copied (i.e. the length to copy is taken from the length field referenced by data_offset, augmented by the additional_bytes field in the case of Aggregators). Compare the Data Length filed in FIGS. 5B and 5C, for instance.

Please note that if the two tracks use different lengthSizeMinusOne values, then the extracted data will need re-formatting to conform to the destination track's length field size.

As to sample description constructor syntax, please see the following example:

```
class aligned(8) SampleDescriptionConstructor ( ) {
   unsigned int(8) length;
   unsigned int(8) track_ref_index;
   int(8) sample_description_index;
   fieldSize = (length − 2) / 2;
   unsigned int(fieldSize) data_offset;
   unsigned int(fieldSize) data_length;
}
```

The semantics for the above sample description constructor syntax could be as follows:

length: the number of bytes that belong to the SampleDescriptionConstructor following this field. The value of length shall be even, greater than or equal to 4, and less than or equal to 10. It corresponds to field DFL in FIGS. 5B and 5C;

track_ref_index identifies the index of the track references of type 'scal' enumerated in the 'tref' box. The value of 0 indicates the current track, where this constructor is found. The value of 1 indicates the first track reference. The value of track_ref_index shall not exceed the number of track references. It corresponds to field TRI in FIGS. 5B and 5C;

sample_description_index identifies the index of sample description enumerated in the 'stsd' box. The value of sample_description_index shall neither be zero nor exceed the number of sample entries. It corresponds to field SO in FIG. 5C;

data_offset is an unsigned offset that is used to address the first data byte of the block to be copied from the sample description. A value of 0 means that copying starts with the first byte of the referenced sample description. It corresponds to field Data Offxet in FIGS. 5B and 5C;

data_length specifies the length of the data block to be copied from the sample description in the referenced track. A value of 0 means that no byte is copied from the referenced sample description. data_length shall not exceed the size of the referenced sample description. It corresponds to field Data Length in FIGS. 5B and 5C;

As to in-line constructor syntax, please see the following example:

```
class aligned(8) InlineConstructor ( ) {
    unsigned int(8) length;
    unsigned int(8) inline_data[length];
}
```

The semantics for the above in-line constructor constructor syntax could be as follows:
length: the number of bytes that belong to the InlineConstructor following this field. The value of length shall be greater than 0. The value of length equal to 0 is reserved. It corresponds to field DFL in FIG. 5A;
inline_data: the data bytes to be returned when resolving the in-line constructor. It corresponds to field Data Filed in FIG. 5A;

Both Aggregators and Extractors may use the NAL unit header as specified in ISO/IEC 23008-2. The NAL units extracted by an extractor or aggregated by an aggregator are all those NAL units that are referenced or included by recursively inspecting the contents of aggregators or extractors. The fields nuh_layer_id and nuh_temporal_id_plus1 may be set as follows: nuh_layer_id may be set to the lowest value of the field in all the aggregated or extracted NAL units. nuh_temporal_id_plus1 may be set to the lowest value of the field in all the aggregated or extracted NAL units.

That is, video data may be conceptualized for streaming a spatially variable section of a scene to a client in any of the above-described manners. The video data is formatted in a file format and comprises one or more source tracks, each source track being associated with a respective one of tiles into which pictures of a video which capture the scene entirely are spatially subdivided, wherein the source tracks have distributed thereinto slices of a video data stream into which the pictures of the video are coded such that each slice has encoded thereinto no more than one tile; and a sets of one or more gathering tracks, each gathering track of which is associated with a respective one of a plurality of positions of the section formed by a corresponding subset of the tiles and comprising construction instructions indicating a synthesis of a section-position-specific video data stream into which pictures showing the scene's section at the respective position are coded. The construction instructions may be selected out of the examples of FIG. 5A to 5C, or FIG. 5A to 5E or out of the just-presented examples.

The following embodiments are concerned with a concept for providing a client with hints for RoI prefetching.

Currently, high-resolution and wide-angle videos are becoming more and more popular. They include 180°-360° panorama or spherical videos. With the increasing sizes of those videos, it becomes impractical to transmit the whole video at high resolution. Different streaming approaches explore, for instance, splitting the video in multiple tiles and transmitting only those that cover the Region of Interest (RoI) of a user. Others may involve transmitting regions of the video to be encoded with varying characteristics such as quality, resolution, etc. to optimize the video bitrate transmitted to the user.

In any of these approaches, such as the mentioned above, the idea is that the video transmission optimization is done based on the user preferences, where the part of the video shown to the user is downloaded at a high quality, while some other parts (not considered as RoI) that might be shown to the user due to user interaction can be downloaded as a prefetch at the same or another quality.

The DASH standard allows for signaling of the spatial relationship of those offered parts of the video by using the Spatial Relationship Descriptor. Although, this descriptor allows a user to understand the relationships of the offered content in terms of spatial area of the video that they cover, there is a gap with respect to RoI signaling. The user does not have detailed information on, for example, spatio-temporal activity within the video. Some works, such as [1], show that knowing the spatio-temporal characteristics of the RoI of a video can lead to a much more efficient transmission scheme, where the important spatial area of videos, covering the main activity that is of interest for most of the users, can be downloaded at higher quality compared to a transmission scheme that is oblivious to RoI characteristics.

Further, as a practical consideration, the streaming session start-up in such a service can be analyzed. It is vital for the client to know about the RoI characteristics before taking decisions regarding the download of actual media data. Hence, on VOD session start-up or live tune-in, the RoI is requested in the optimal quality and is actually being displayed to the user.

An MPD based solution using Role-Main signaling comes with the disadvantage of increasing MPD size disproportionally and cannot be used in an efficient manner for live streaming services, since this would involve either too frequent MPD pulling or additional delays coming from some kind of indication that a new MPD may be requested that triggers an MPD update at the client.

The embodiments described herein below propose mechanisms that are used to signal the position of one or more RoIs and its movement, i.e. mapping to representations or tiles over time:

Inband solution using 'emsg' file format boxes: suitable for VoD. Each segment carrying this box would indicate spatial location of the RoI in coming segment, so that the client can use it adequately, e.g. by using more of its available bandwidth for prefetching of the corresponding representation. Suitable for prefetching hint, not suitable for start up ROI.

Out-of-band solution using SAND messages: suitable for live services. In such an environment, 'emsg' might not be the best solution since the content generation part would increase the delay as it would involve to wait for the next segment to be processed to be able to add the 'emsg' box. Additionally, this information could be used for playback start-up (or seeking) in the VoD context. Suitable for prefetching hint and start up ROI.

A further option is a box at the beginning of the file that described different time intervals for which one or more RoIs are described by declaring a position (x,y) and a dimension (width, height).

The concept Using 'emsg' could be as follows.

The DASH event message box is defined in MPEG DASH as:

```
aligned(8) class DASHEventMessageBox extends FullBox('emsg',
    version = 0, flags = 0){
        string      scheme_id_uri;
        string      value;
        unsigned int(32) timescale;
        unsigned int(32) presentation_time_delta;
        unsigned int(32) event_duration;
        unsigned int(32) id;
        unsigned int(8) message_data[ ];
    }
}
```

The proposed RoI signaling would then add a scheme_id_uri that signals the main RoI coordinates. The URN "urn:mpeg:dash:RoIchangeEvent:2016" could be defined to identify the RoI characteristics. Alternatively the existing scheme ""urn:mpeg:dash:event:2012" could be extended and new values could be added For events using this schema, the 'emsg'. message_data[ ]' field will contain the DASH RoIchangeEvent structure defined below:

```
aligned(8) struct DASHRoIchangeEvent
{
  if ('emsg'.value == 1 ) //single RoI
  {
    unsigned int(32) source_id; // Refers to the source_id in MPD
    in Sect. H.2
    unsigned int(32) x; // horizontal position of RoI
    unsigned int(32) y; // vertical position of RoI
    unsigned int(32) width; // width position of RoI
    unsigned int(32) height; // height position of RoI
  }
  if ('emsg'.value == 2 ) //multiple RoIs
  {
    unsigned int(32) source_id; // Refers to the source_id in MPD
    in Sect. H.2
    unsigned int(8) num_RoIs; // Number of RoIs present
    for (i=0;i<numRoIs;i++){
      unsigned int(32) x_i; // horizontal position of RoI
      unsigned int(32) y_i; // vertical position of RoI
      unsigned int(32) width_i; // width position of RoI
      unsigned int(32) height_i; // height position of RoI
    }
  }
}
```

The information would relate to the next segment to be downloaded. Alternatively a further version could be developed that indicates the RoI for more than one segment by adding further emsg.values.

The concept using SAND could be as follows.

A new Parameters Enhancing Reception (PER, i.e. message sent from a DASH Aware Network Element (DANE) to the DASH Client) would be defined that indicates the RoI at a given time. The message would be similar to the one defined before for the 'emsg' case:

| Parameter | Type | Cardinality | Description |
| --- | --- | --- | --- |
| Playout_time | time | 1 | Playback time of the segment to which the following RoI description applies. |
| Source_id | uint | 1 | Source_id as defined in H.1 to which the RoI position applies. |
| RoISignaling | array | 1..N | List of RoIs |
| x | uint | 1 | Horizontal position of the RoI. |
| y | uint | 1 | Vertical position of the RoI. |
| width | uint | 1 | Width of the RoI. |
| height | uint | 1 | Height of the RoI |

The concept Using a central box e.g. in the 'moov' describing the temporal changes of the RoI could be described as follows.

```
RoIdescriptionbox 'roid'
aligned(8) class SegmentIndexBox extends FullBox('sidx', version, 0) {
  unsigned int(32) source_ID;
  unsigned int(32) timescale;
  if (version==0) {
    unsigned int(32) earliest_presentation_time; // earliest
    presentation time for which the
  box
      describes the RoIs
  }
  else {
    unsigned int(64) earliest_presentation_time;
  }
  unsigned int(16) reserved = 0;
  unsigned int(16) RoIs_count;
  for(i=1; i <= RoIs_count; i++) //number of RoIs described in time
  {
    unsigned int(32) RoI_duration;
    unsigned int(32) x;
    unsigned int(32) y;
    unsigned int(32) width;
    unsigned int(32) height;
  }
}
```

Similarly the message could be changed to incorporate multiple RoIs by adding a parameter as shown below:

```
...
for(i=1; i <= RoIs_count; i++) //number of RoIs intervals described
{
  unsigned int(8) RoI_count_per_interval
    for(i=j; j <= RoIs_count; j++) //number of RoIs described for
    each of intervals in time
    {
      unsigned int(32) RoI_duration;
      unsigned int(32) x;
      unsigned int(32) y;
      unsigned int(32) width;
      unsigned int(32) height;
    }
}
```

Figure 15:
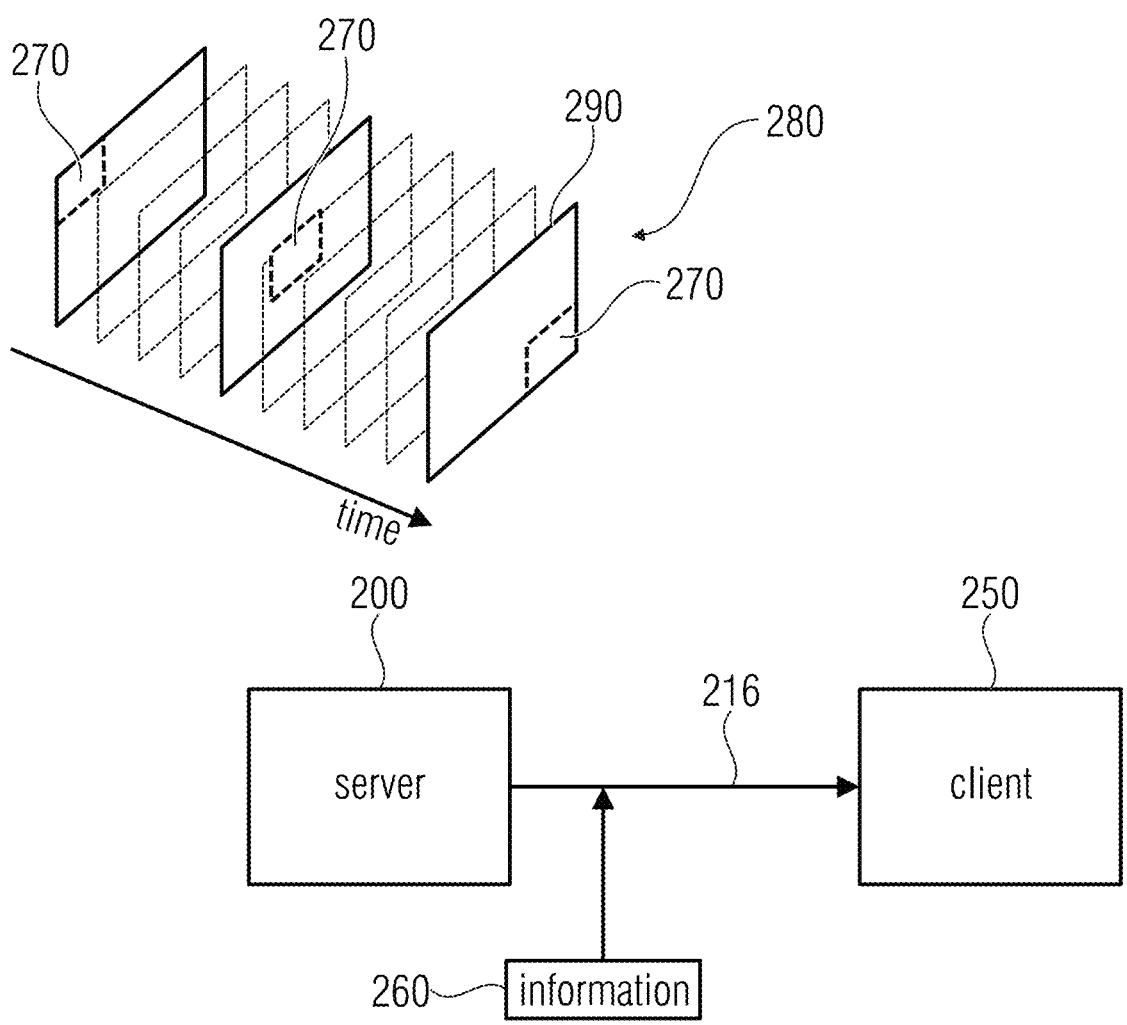
FIG. 15 shows a schematic diagram showing a server and a client in accordance with an embodiment of enabling a time-varying region of interest indication.

In order to explain embodiments in accordance with the just outlined concept, reference is made to the following figures. FIG. 15 shows video streaming server 200 and client 250. Merely as an option, server 200 and client 250 may be implemented in a manner so as to comply with any of the above described embodiments of FIGS. 1 to 15. In any case, the video streaming server 200 is configured to accompany a video stream 216 representing a scene and being streamed from server 200 to client 250 with an information 260 indicating a position of a region of interest 270 in a manner such that the position temporally varies. That is, the video streaming server 200 has access to video data representing a certain scene. The video data may, for instance, have encoded therein a video 280, each picture 290 of which shows the scene. The video data concerning video 280 may be conceptualized in a manner outlined above with respect to FIGS. 1 to 15. That is, server 200 may be configured in such a manner that client 250 is allowed to retrieve from server 200 the video stream 216 in such a manner that the retrieved video stream 216 merely concerns the region of interest 270 which, using the terminology of FIGS. 1 to 15, would represent the section. Alternatively, server 200 merely renders available the retrieval of video data stream 216 in a manner such that video data stream 216 conveys information on the scene completely. However, in the latter case, the client 250 would be, for instance, allowed to retrieve or fetch segments of the video stream 216 in different orders. For example, client 250 could be provided with the opportunity to fetch a segment concerning a certain temporal portion of the video 280 and concerning a certain spatial region of the scene first before retrieving the segments of the same temporal portion, but with respect to another spatial region. As became clear by mentioning the possibility that server 200 and client 250 may be embodied in a manner conforming to server 10 and client 50 of FIGS. 1 and 2, the video stream 260 in FIG. 15 may be a stream corresponding to stream 16 of FIG. 1.

FIG. 15 illustrates that information 260 varies the position of the region of interest 270 in time. Without such an information 260, client 250 is not able to fetch for a certain current time segment of this scene which most likely includes the most interesting portion of this scene within the current time segment. For prefetching purposes and for the purpose of appropriately starting the retrieval of video stream 216 it would, however, be favorable for client 250 to have information 260 at hand as early as possible in order to render a fetching request caused by the client's user concerning a spatially different region of the video 280, but referring to an already fetched temporal segment of video 280, as unlikely as possible.

In accordance with an embodiment, the video streaming server 10 is configured to convey the information 260 within a file format box of the video stream. That is, video stream 216 would be conveyed from server 200 to client 250 in accordance with a file format and the information 260 would be embedded within the thus formatted video stream 216. Naturally, the client 250 would have to start the retrieval of video stream 216 "blindly", i.e. without any information 260 on the position of the region of interest 270. Alternatively, another information concerning the region of interest 270, namely concerning the position of the region of interest at the time of starting the retrieval of the video, could be included by server 200 into the media presentation description or the initial segment of the video stream 216 sent from server 200 upon an appropriate request from client 250 to server 200. In this manner, client 250 would have the chance to obtain a first hint on the position of the region of interest 270 from an appropriate information in the media presentation description, with then using information 260 so as to schedule prefetching future time segments of video 280.

According to an alternative also already described above, the video streaming server 200 may be a DASH server and be configured to convey the information 260 out-of-band by way of SAND messages instead of within a file format box of video stream 216. Using both concepts, video streaming server 200 is able to intermittently update the information 260 so as to update the position of the region of interest 270. In particular, the video streaming server is able to schedule the intermittent update of the information 270 at time instances independent from client requests. That is, client 250 does not need to send requests for an update of information 260 to server 200. Rather, server 200 initiates the update or re-sending of information 260 on its own.

Additionally or alternatively, server 200 may even be configured to convey the information 260 at a start of the streaming in such a manner that the information 260 also schedules forthcoming changes of the position of the region of interest 270. For example, the video content of video 280 might be known at the server side and accordingly server 200 might, for instance, provide the manifest or media presentation description with the information 260 in such a manner that information 260 indicates, in a temporal varying manner, the position of the region of interest 270, i.e. indicates the position of the region of interest 270 in such a manner that the position changes at scheduled time instances during the temporal length of video 280. Alternatively, server 200 might, for instance, provide the initial segment typically fetched by the client after having requested and inspected the MPD, with the information 260 in such a manner that information 260 indicates, in a temporal varying manner, the position of the region of interest 270. In the latter case, the central box or RoIdescriptionBox described above may be used.

An indication of the presence or availability of the information 260 could be indicated in the MPD to the client. The presence of the information 260 or the fact that the video stream 216 is accompanied by the information 260 could be rendered dependent on a corresponding request by the client. Server 200 could, thus, skip the accompanying if not so requested by the client. In case of the information 260 being an inband information, such as an information included in the MPD ('emsg') or in the initial segment ('roid' variant), the procedure may, for example, start with the client requesting an MPD comprising a respective indication of availability, followed by the client requesting the MPD anew along with a request of information 260, or followed by the client requesting from the server the initial segment along with requesting the presence of information 260. In a similar manner, the presence of the information 260 out-of-band could be made dependent on a corresponding request from the client. Depending on the client's wish, the server would or would not send RoI information 260 via SAND messages to the client.

Similar to the above description where it has been noted that server 10 and client 50 may be embodied in hardware, firmware or software, server 200 and client 250 may be implemented in the same manner, namely in the form of hardware, firmware or software.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive encoded data stream or signal can be stored on a digital storage medium or can be transmitted on a transmission medium such as a wireless transmission medium or a wired transmission medium such as the Internet. Where ever the insertion or encoding of some information into a data stream has been described, this description is concurrently to be understood as a disclosure that the resulting data stream comprises the respective information, syntax element of flag or so forth.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. Video streaming server comprising a programmed computer or electronic circuit configured to
   access slices of a video data stream into which pictures of a video are coded each of which shows a scene, wherein the pictures are spatially subdivided into tiles and within each picture tiles within the respective picture are coded independent from each other; and
   render available to a client a streaming of a stream concerning a section of the scene, the stream being formatted in a file format and comprising
      a set of one or more source tracks incorporating the slices into which tiles within the section are encoded, and
      a set of one or more gathering tracks comprising construction instructions indicating a synthesis of a section-specific video data stream into which pictures showing the scene's section are encoded on the basis of the one or more source tracks;
   wherein the construction instructions form a sequence of one or more copying instructions and one or more insertion instructions;
   wherein the one or more copying instruction, instruct to copy certain portions for the slices of the set of one or more source tracks for a synthesis of the section-specific video data stream, and
      the one or more insertion instructions instruct to insert a content of an operator field of the one or more insertion instructions for a synthesis of the section-specific video data stream.

2. Video streaming server according to claim 1, wherein the pictures are encoded into the slices of the video data stream with interruption of coding interdependencies across tile boundaries (25).

3. Video streaming server according to claim 1, wherein each source track is associated with a respective one of the tiles into which the pictures of the video are spatially subdivided and incorporates the slices into which the tile of the picture associated with the respective source track is encoded.

4. Video streaming server according to claims 1, configured to send to the client a manifest which treats
   each of the set of one or more source tracks and
   the set of one or more gathering tracks
as separate representations and indicates the set of one or more gathering tracks as being dependent on the one or more source tracks.

5. Video streaming server according to claim 1, configured so that the video data stream and the section-specific video data stream are decodable by one video decoder.

6. Video streaming server according to claim 1, configured to
   render available to the client a streaming of a further stream concerning a further section of the scene, the further stream being formatted in the file format and comprising
      a further set of one or more source tracks incorporating the slices into which tiles within the further section are encoded, and
      a further set of one or more gathering tracks comprising construction instructions indicating a synthesis of a further section-specific video data stream into which pictures showing the scene's further section are encoded, on the basis of the further set of one or more source tracks.

7. Video streaming server according to claim 6, wherein the construction instructions comprised by the further set of one or more gathering tracks indicate the synthesis by one or more of
signaling replacements for first portions of the slices incorporated into the further set of one or more source tracks, and
instructing to copy second portions of the slices incorporated into the further set of the one or more source tracks.

8. Video streaming server according to claim 1, configured to provide a manifest to the client which treats
each source track of the set and further set of one or more source tracks,
the set of one or more gathering tracks and
the further set of one or more gathering tracks
as separate representations and indicates the set of one or more gathering tracks as being dependent on the set of one or more source tracks and the further set of one or more gathering tracks as being dependent on the further set of one or more source tracks.

9. Video streaming server according to claim 8 wherein the video streaming server is configured to provide the manifest with an explicit signaling of mutually distinct URL Uniform Resource Locator) bases for the representations pertaining the set of one or more gathering tracks and the further set of one or more gathering tracks, respectively.

10. Video streaming server according to claim 8 wherein the section and further section are of equal size in terms of tiles, and the video streaming server is configured to provide the manifest with an URL template defining a calculation regulation for determining URLs of segments of the representations pertaining the set of one or more gathering tracks and the further set of one or more gathering tracks, respectively, dependent on a spatial position of the section of the scene to be retrieved.

11. Video streaming server according to claim 8, configured to
provide a manifest to the client which treats each of the set and further set of one or more source tracks as separate representations and
convey the set of one or more gathering tracks within segments of representations which correspond to the source tracks containing the slices having encoded thereinto tiles within the scene's section and convey the further set of one or more gathering tracks within segments of representations which correspond to source tracks containing the slices having encoded thereinto tiles within the further scene's section.

12. Video streaming server according to claim 11, configured to
convey the set of one or more gathering tracks within segments of a representation which corresponds to the source track containing the slices having encoded thereinto the tile which is located at a predetermined tile position within the scene's section, and convey the further set of one or more gathering tracks within segments of a representation which correspond to the source track containing the slices having encoded thereinto the tile which is located at the predetermined tile position within the further scene's section.

13. Video streaming server according to claim 11, configured to provide the manifest with an information indicating that the set of one or more source tracks and the further set of one or more source tracks may be retrieved in a manner separate from other source tracks and convey the set of one or more gathering tracks and the further set of one or more gathering tracks within their segments.

14. Video streaming server according to claim 13 configured to
for each tile lying within the scene's section, convey within segments of a representation which corresponds to the source track containing the slices having encoded thereinto the respective tile, one of the set of one or more gathering tracks which is specific for the synthesis of the section-specific video data stream within the respective tile, and
for each tile lying within the further scene's section, convey within segments of a representation which corresponds to the source track containing the slices having encoded thereinto the respective tile, one of the further set of one or more gathering tracks which is specific for the synthesis of the further section-specific video data stream within the respective tile.

15. Video streaming server according to claim 14,
wherein the section and the further section overlap each other so that there is a predetermined tile lying within the scene's section and the further scene's section, and
the video streaming server is configured to
convey within segments of the representation which corresponds to the source track containing the slices having encoded thereinto the predetermined tile, a parametrizable gathering track which is parametrizable so as to,
according to a first parametrizing setting, become the gathering track of the set of one or more gathering tracks which is specific for the synthesis of the section-specific video data stream within the predetermined tile, and
according to a second parametrizing setting, become the gathering track of the further set of one or more gathering tracks which is specific for the synthesis of the further section-specific video data stream within the predetermined tile.

16. Video streaming server according to claim 15, wherein the parametrizable gathering track comprises construction instructions comprising an index with
the gathering track of the set of one or more gathering tracks which is specific for the synthesis of the section-specific video data stream within the predetermined tile resulting from skipping within the parametrizable gathering track those construction instructions the index comprised by which is different from a first setting, and
the gathering track of the further set of one or more gathering tracks which is specific for the synthesis of the further section-specific video data stream within the predetermined tile resulting from skipping within the parametrizable gathering track those construction instructions the index comprised by which is different from a second setting.

17. Video streaming server according to claim 1, wherein the construction instructions comprise
an insertion instruction
comprising
a further constructor tag,
a data field length indication indicating a data field length, and a data field of the data field length corresponding to a replacement of a non-copied portion of the slices of the set of one or more source tracks, and instructing to insert the replacement into the section-specific video data stream.

18. Video streaming server comprising a programmed computer or electronic circuit configured to access slices of a video data stream into which pictures of a video are coded each of which shows a scene, wherein the pictures are spatially subdivided into tiles and within each picture tiles within the respective picture are coded independent from each other; and render available to a client a streaming of a stream concerning a section of the scene, the stream being formatted in a file format and comprising a set of one or more source tracks incorporating the slices into which tiles within the section are encoded, and a set of one or more gathering tracks comprising construction instructions indicating a synthesis of a section-specific video data stream into which pictures showing the scene's section are encoded on the basis of the one or more source tracks;

wherein the construction instructions comprise:

a copying instruction comprising a constructor tag, an index to a reference track of the set of one or more source tracks, an indicator of the sample or picture or access unit of the reference track which the copying instruction refers to, and an indication of a portion to be copied out of the sample or picture or access unit of the reference track by data offset and data length, and instructing to copy the portion to be copied into the section-specific video data stream.

19. Video streaming server according to claim 18, wherein the construction instructions signal the synthesis of the section-specific video data stream in bitstream domain without transcoding.

20. Client configured to retrieve from a video streaming server a video concerning a section of a scene, the client comprising a programmed computer or electronic circuit configured to retrieve from the video streaming server a stream formatted in a file format and comprising a set of one or more source tracks incorporating slices, the slices in the set of one or more source tracks forming a subset of slices of a video data stream into which pictures of a video are coded each which shows the scene, wherein the pictures are spatially subdivided into tiles and within each picture tiles within the respective picture are coded independent from each other, the subset of slices incorporating the slices into which tiles within the section are encoded; and a set of one or more gathering tracks comprising construction instructions indicating a synthesis of a section-specific video data stream into which pictures showing the scene's section are encoded;

synthesize the section-specific video data stream according to construction instructions in the set of one or more gathering tracks on the basis of the one or more source tracks, and subjecting the section-specific video data stream to decoding by a video decoder wherein the construction instructions form a sequence of copying instructions and the client is configured to, according to the sequence of copying instructions, and one or more insertion instructions, wherein the client is configured to, according to the one or more copying instructions, copy certain portions from the slices of the set of one or more source tracks to synthesize the section-specific video data stream, and according to the one or more insertion instructions, insert a content of an operator field of the one or more insertion instructions to synthesize the section-specific video data stream.

21. Client according to claim 20, wherein the pictures are encoded into the slices of the video data stream with interruption of coding interdependencies across tile boundaries such that each slice has encoded thereinto one tile independent from any other tile covering a spatially distinct portion of the picture including the one tile or any other picture.

22. Client according to claim 20, wherein each source track is associated with a respective one of the tiles into which the pictures of the video are spatially subdivided and incorporates the slices into which the tile of the pictures associated with the respective source track is encoded.

23. Client according to claim 20, configured to receive from the video streaming server a manifest which treats each of the one or more source tracks and the set of one or more gathering tracks as separate representations and indicates the set of one or more gathering tracks as being dependent on the one or more source tracks, and retrieve the separate representations from the video streaming server as the stream.

24. Client according to claim 20, wherein the video data stream and the section-specific video data stream are both decodable by the video decoder.

25. Client according to claim 20, configured to

Retrieve a further stream concerning a further section of the scene from the video streaming server, the further stream being formatted in the file format and comprising a further set of one or more source tracks incorporating the slices into which tiles of a further set of tiles are encoded which spatially forms the further section, and a further set of one or more gathering tracks comprising construction instructions indicating a synthesis of a further section-specific video data stream into which pictures showing the scene's further section are encoded, synthesize the further section-specific video data stream according to construction instructions in the further set of one or more gathering tracks on the basis of the further set of one or more source tracks, and subject the further section-specific video data stream to decoding by the video decoder.

26. Client according to claim 25, configured to perform the synthesis according to the construction instructions comprised by the further set of one or more gathering tracks by one or more of replacing first portions of the slices incorporated into the further set of one or more source tracks with replacement signaled by the construction instructions in the further set of one or more gathering tracks, and copying second portions of the slices incorporated into the further set of the one or more source tracks.

27. Client according to claim 25, configured to

Receive from the video streaming server a manifest which treats each source track of the set and further set of one or more source tracks,
- the set of one or more gathering tracks and
- the set of one or more further gathering tracks as separate representations and indicates the set of one or more gathering tracks as being dependent on the set of one or more source tracks and the further set of one or more gathering tracks as being dependent on the further set of one or more source tracks, and in retrieving the stream from the video streaming server, retrieve the representations associated with the set of one or more source tracks and the set of one or more gathering tracks from the video streaming server, and in retrieving the further stream from the video streaming server, retrieve the representations associated with the further set of one or more source tracks and the further set of one or more gathering tracks from the video streaming server.

28. Client according to claim 27, wherein the client is configured to derive from the manifest an explicit signaling of mutually distinct URL (Uniform Resource Locator) bases for the representations pertaining the set of one or more gathering tracks and the further set of one or more gathering tracks, respectively.

29. Client according to claim 27, wherein the section and further section are of equal size in terms of tiles, and the client is configured to, in retrieving from the video streaming server the stream and in retrieving from the video streaming server the further stream, derive from the manifest a URL template defining a calculation regulation, using the calculation regulation, determining URLs of segments of the representations pertaining the set of one or more gathering tracks and the further set of one or more gathering tracks, respectively, dependent on a spatial position of the section of the scene to be retrieved, retrieve the segments on the basis of the URLs determined which convey the set of one more gathering tracks in case of retrieval of the stream and the further set of one or more gathering tracks in case of retrieval of the further stream.

30. Client according to claim 27, configured to receive from the video streaming server a manifest which treats each of the set and further set of one or more source tracks as separate representations and in retrieving the stream from the video streaming server, read the one or more gathering tracks from segments of representations which correspond to the source tracks containing the slices having encoded thereinto tiles within the scene's section, and in retrieving the further stream from the video streaming server, read the further set of one or more gathering tracks from segments of representations which correspond to the source tracks containing the slices having encoded thereinto tiles within the further scene's section.

31. Client according to claim 30, configured to in retrieving the stream from the video streaming server, read the set of one or more gathering tracks from segments of a representation which corresponds to the source track containing the slices having encoded thereinto the tile which is located at a predetermined tile position within the scene's section, and in retrieving the further stream from the video streaming server, read the further set of one or more gathering tracks from segments of a representation which correspond to the source track containing the slices having encoded thereinto the tile which is located at the predetermined tile position within the further scene's section.

32. Client according to claim 30, configured to in retrieving the stream from the video streaming server, read, for each tile lying within the scene's section, from segments of a representation which corresponds to the source track containing the slices having encoded thereinto the respective tile, one of the set of one or more gathering tracks which is specific for the synthesis of the section-specific video data stream within the respective tile, and in retrieving the further stream from the video streaming server, read, for each tile lying within the further scene's section, from segments of a representation which corresponds to the source track containing the slices having encoded thereinto the respective tile, one of the further set of one or more gathering tracks which is specific for the synthesis of the further section-specific video data stream within the respective tile.

33. Client according to claim 32, wherein the section and the further section overlap each other so that there is a predetermined tile lying within the scene's section and the further scene's section, and the client is configured to, in retrieving from the video streaming server the stream and in retrieving from the video streaming server the further stream, read from segments of the representation which corresponds to the source track containing the slices having encoded thereinto the predetermined tile, a parametrizable gathering track, in case of retrieval of the stream, parametrize the parametrizable gathering track using a first parametrizing setting so that the parametrizable gathering track becomes the gathering track of the set of one or more gathering tracks which is specific for the synthesis of the section-specific video data stream within the predetermined tile, and in case of retrieval of the further stream, parametrize the parametrizable gathering track using a second parametrizing setting so that the parametrizable gathering track becomes the gathering track of the further set of one or more gathering tracks which is specific for the synthesis of the section-specific video data stream within the predetermined tile.

34. Client according to claim 33, configured to in parametrizing the parametrizable gathering track using the first parametrizing setting, skipping within the parametrizable gathering track construction instructions comprising an index which is different from a first setting, and in parametrizing the parametrizable gathering track using the second parametrizing setting, skipping within the parametrizable gathering track construction instructions comprising an index which is different from a second setting.

35. Client configured to retrieve from a video streaming server a video concerning a section of a scene, the client comprising a programmed computer or electronic circuit configured to retrieve from the video streaming server a stream formatted in a file format and comprising
- a set of one or more source tracks incorporating slices the slices in the set of one or more source tracks forming a subset of slices of a video data stream into which pictures of a video are coded each which shows the scene, wherein the pictures are spatially subdivided into tiles and within each picture tiles within the respective picture are coded independent from each other, the subset of slices incorporating the slices into which tiles within the section are encoded; and a set of one or more gathering tracks comprising construction instructions indicating a synthesis of a section-specific video data stream into which pictures showing the scene's section are encoded;

synthesize the section-specific video data stream according to construction instructions in the set of one or more gathering tracks on the basis of the one or more source tracks, and subjecting the section-specific video data stream to decoding by a video decoder wherein the construction instructions comprise a copying instruction comprising a constructor tag, an index to a reference track of the set of one or more source tracks, an indicator of the sample or picture or access unit of the reference track which the copying instruction refers to, and an indication of a portion to be copied out of the sample or picture or access unit of the reference track by data offset and data length, the client configured to, according to the copying instruction, copy the portion to be copied into the section-specific video data stream.

36. Client according to claim 35, wherein the construction instructions comprise an insertion instruction comprising a further constructor tag, a data field length indication indicating a data field length, and a data field of the data field length corresponding to a replacement of a non-copied portion of the slices of the set of one or more source tracks, the client configured to, according to the insertion instruction, insert the replacement into the section-specific video data stream.

37. Client according to claim 35, wherein the client is configured to, according to the construction instructions, synthesize the section-specific video data stream in bitstream domain without transcoding.

38. Non-transitory digital storage medium having stored thereon video data conceptualized for streaming a spatially variable section of a scene to a client, the video data being formatted in a file format and comprising a set of one or more source tracks, each source track being associated with a respective one of tiles into which pictures of a video which capture the scene entirely are spatially subdivided, wherein the source tracks have distributed thereinto slices of a video data stream into which the pictures of the video are coded and within each picture tiles within the respective picture are coded independent from each other; and a set of one or more gathering tracks, each set of which is associated with a respective one of a plurality of positions of the section formed by a corresponding subset of the tiles and comprising construction instructions indicating a synthesis of a section-specific video data stream into which pictures showing the scene's section at the respective position are coded on the basis of the one or more source tracks;

wherein the construction instructions form a sequence of one or more copying instructions and one or more insertion instructions, wherein, the one or more copying instructions instructed to copy certain portions from the slices of the set of one or more source tracks for a synthesis of the section-specific video data stream, the one or more insertion instructions instruct to insert a content of an operator field of the one or more insertion instructions for a synthesis of the section-specific video data stream.

39. Non-transitory digital storage medium according to claim 38, wherein the second portions include syntax elements in slice headers of slices, the syntax elements indicating whether the slice to which the slice header belongs, is a, in terms of a picture traversing decoding order, first slice of a picture of the video, a position of slice to which the slice header belongs, measured relative to a predetermined picture's corner.

40. Non-transitory digital storage medium according to claim 38, wherein the construction instructions comprise an insertion instruction comprising a constructor tag, a data field length indication and a data field of the data field length corresponding to a replacement of a non-copied portion of the slices of the set of one or more source tracks, and instructing to insert the replacement into the section-specific video data stream.

41. Non-transitory digital storage medium having stored thereon video data conceptualized for streaming a spatially variable section of a scene to a client, the video data being formatted in a file format and comprising a set of one or more source tracks, each source track being associated with a respective one of tiles into which pictures of a video which capture the scene entirely are spatially subdivided, wherein the source tracks have distributed thereinto slices of a video data stream into which the pictures of the video are coded and within each picture tiles within the respective picture are coded independent from each other and a set of one or more gathering tracks, each set of which is associated with a respective one of a plurality of positions of the section formed by a corresponding subset of the tiles and comprising construction instructions indicating a synthesis of a section-specific video data stream into which pictures showing the scene's section at the respective position are coded on the basis of the one or more source tracks, wherein the construction instructions comprise a copying instruction comprising a further constructor tag, an index to a reference track of the set of one or more source tracks, an indicator of the sample or picture or access unit of the reference track which the copying instruction refers to, and an indication of a portion to be copied out of the sample or picture or access unit of the reference track by data offset and data length, and instructing to copy the portion to be copied into the section-specific video data stream.

42. Non-transitory digital storage medium according to claim 41, wherein the construction instructions signal the synthesis of the section-specific video data stream in bitstream domain without transcoding.

43. Method for video streaming comprising
receiving slices of a video data stream into which pictures of a video are coded each of which shows a scene, wherein the pictures are spatially subdivided into tiles and within each picture tiles within the respective picture are coded independent from each other; and
rendering available to a client a streaming of a stream concerning a section of the scene, the client comprising a programmed computer or electronic circuit, the stream being formatted in a file format and comprising
a set of one or more source tracks incorporating the slices into which tiles within the section are encoded, and
a set of one or more gathering tracks comprising construction instructions (34) indicating a synthesis of a section-specific video data stream into which pictures showing the scene's section are encoded, on the basis of the one or more source tracks;
wherein the construction instructions form a sequence of one or more copying instructions and
one or more insertion instructions
wherein the one or more insertion instructions instruct to insert a content of an operator field of the one or more insertion instructions for a synthesis of the section-specific video data stream.

44. Non-transitory computer-readable storage medium storing a computer program having a program code for performing, when running on a computer, a method according to claim 43.

45. Method for retrieving from a video streaming server a video concerning a section of a scene, the method comprising
retrieving from the video streaming server a stream formatted in a file format and comprising
a set of one or more source tracks incorporating slices, the slices in the set of one or more source tracks forming a subset of slices of a video data stream into which pictures of a video are coded each which shows the scene, wherein the pictures are spatially subdivided into tiles and within each picture tiles within the respective picture are coded independent from each other, the subset of slices incorporating the slices into which tiles within the section are encoded; and
a set of one or more gathering tracks comprising construction instructions indicating a synthesis of a section-specific video data stream into which pictures showing the scene's section are encoded;
synthesizing the section- -specific video data stream according to construction instructions in the set of one or more gathering tracks on the basis of the one or more source tracks,
subjecting the section-specific video data stream to decoding by a video decoder
wherein the construction instructions form a sequence of one or more copying instructions and
one or more insertion instructions,
wherein the method comprises,
according to the one or more copying instructions, copying certain portions from the slices of the set of one or more source tracks to synthesize the section-specific video data stream, and
according to the one or more insertion instructions, inserting a content of an operator field of the one or more insertion instructions to synthesize the section-specific video data stream.

* * * * *

UNITED STATES PATENT AND TRADEMARK OFFICE
CERTIFICATE OF CORRECTION

PATENT NO. : 11,917,220 B2  
APPLICATION NO. : 17/445860  
DATED : February 27, 2024  
INVENTOR(S) : Robert Skupin et al.

Page 1 of 2

It is certified that error appears in the above-identified patent and that said Letters Patent is hereby corrected as shown below:

In the Claims

Claim 1, Column 36:
- Line 28: Change to "instructions" instead of "instruction"
- Line 29: Change to "from" instead of "for"

Claim 4, Column 36:
- Line 46: Change to "claim" instead of "claims"

Claim 8, Column 37:
- Line 14: Change to "according to claim 6" instead of "according to claim 1"

Claim 9, Column 37:
- Line 26: Add "," after "to claim 8"
- Line 29: Add "(" before "Uniform Resource Locator)"

Claim 10, Column 37:
- Line 32: Add "," after "to claim 8"

Claim 14, Column 38:
- Line 8: Add "," after "to claim 13"

Claim 20, Column 39:
- Line 66: Change to "subject" instead of "subjecting"

Claim 20, Column 40:
- Lines 2 – 3: Change to read: "wherein the construction instructions form a sequence of one or more copying instructions and one or more insertion instructions,"

Signed and Sealed this  
Twenty-sixth Day of November, 2024

Katherine Kelly Vidal  
*Director of the United States Patent and Trademark Office*

CERTIFICATE OF CORRECTION (continued)
U.S. Pat. No. 11,917,220 B2

Claim 35, Column 43:
• Line 11: Change to read: "according to the construction instructions"
• Line 14: Change to "subject" instead of "subjecting"

Claim 38, Column 44:
• Line 5: Change to "instruct" instead of "instructed"
• Line 8: Change to read: "synthesis of the section-specific video data stream, and"

Claim 39, Column 44:
• Line 20: Change to read: "first slice of a picture of the video, or"

Claim 43, Column 45:
• Line 19: Delete "(34)"
• Line 26: Change to read: "wherein the construction instructions form a a sequence of one or more copying instructions and one or more insertion instructions, wherein the one or more copying instructions instruct to copy certain portions from the slices of the set of one or more source tracks for a synthesis of the section-specific video data steam, and the one of more insertion instructions instruct to insert a content of an operator field of the one or more insertion instructions for a synthesis of the section-specific video data stream."

Claim 44, Column 45:
• Line 33: Change paragraph from "when running on a computer, a method according to claim 43" to "when running on a computer, a method according to claims 42 to 43."

Claim 45, Column 46:
• Line 17: Change to "section-specific" instead of "section- -specific"
• Line 18: Change to read: "according to the construction instructions"